United States Patent
Ko et al.

(10) Patent No.: US 12,129,977 B2
(45) Date of Patent: Oct. 29, 2024

(54) LIGHTING APPARATUS AND LAMP COMPRISING SAME

(71) Applicant: LG INNOTEK CO., LTD., Seoul (KR)

(72) Inventors: Kwang Hyun Ko, Seoul (KR); Moo Ryong Park, Seoul (KR); Dong Hyun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 18/026,963

(22) PCT Filed: Oct. 6, 2021

(86) PCT No.: PCT/KR2021/013663
§ 371 (c)(1),
(2) Date: Mar. 17, 2023

(87) PCT Pub. No.: WO2022/075727
PCT Pub. Date: Apr. 14, 2022

(65) Prior Publication Data
US 2023/0333304 A1    Oct. 19, 2023

(30) Foreign Application Priority Data

Oct. 7, 2020 (KR) .................. 10-2020-0129102

(51) Int. Cl.
| | |
|---|---|
| *F21S 4/20* | (2016.01) |
| *F21S 43/14* | (2018.01) |
| *F21S 43/239* | (2018.01) |
| *F21S 43/243* | (2018.01) |
| *F21S 43/249* | (2018.01) |

(Continued)

(52) U.S. Cl.
CPC ................ *F21S 4/20* (2016.01); *F21S 43/14* (2018.01); *F21S 43/239* (2018.01);
(Continued)

(58) Field of Classification Search
CPC .......... F21V 7/043; F21V 7/09; F21V 7/0091; F21S 43/249; F21S 43/14; F21S 43/243;
(Continued)

(56) References Cited

U.S. PATENT DOCUMENTS 11,164,993 B2    11/2021 Kang et al.
11,450,786 B2    9/2022 Kang et al.
(Continued)

FOREIGN PATENT DOCUMENTS

EP        3712969        9/2020
KR    10-2009-0007612    1/2009
(Continued)

*Primary Examiner* — Erin Kryukova
(74) *Attorney, Agent, or Firm* — KED & ASSOCIATES, LLP

(57) ABSTRACT

The lighting apparatus disclosed to an embodiment includes a substrate, a plurality of light emitting devices disposed on the substrate, a first reflective layer disposed on the substrate, a resin layer on the first reflective layer, and a second reflective layer on the resin layer and the resin layer includes a first side surface facing the light emitting surfaces of the plurality of light emitting devices and a second side surface opposite to the first side surface, and the first side surface includes a plurality of first reflective surfaces convex with respect to the light emitting surfaces of the light emitting devices and at least one second reflective surface having a concave shape with respect to the light emitting surfaces of the light emitting devices, wherein the plurality of first reflective surfaces are disposed on a region corresponding to each of the plurality of light emitting devices in an optical axis direction, and the second reflective surface is disposed between the plurality of first reflective surfaces, and light emitted through the light emitting surfaces of the light emitting devices may be reflected from the first side surfaces and emitted through the second side surface.

20 Claims, 12 Drawing Sheets

(51) Int. Cl.
*F21S 43/31* (2018.01)
*F21V 7/04* (2006.01)
*F21V 7/09* (2006.01)
*F21V 8/00* (2006.01)

(52) U.S. Cl.
CPC ........... *F21S 43/243* (2018.01); *F21S 43/249* (2018.01); *F21S 43/31* (2018.01); *F21V 7/043* (2013.01); *F21V 7/09* (2013.01); *G02B 6/0045* (2013.01)

(58) Field of Classification Search
CPC ...... F21S 43/239; F21S 43/31; G02B 6/0045; G02B 6/0058; G02B 6/0061; G02B 6/0038; G02B 6/0035; G02B 6/0021
See application file for complete search history.

(56) References Cited

U.S. PATENT DOCUMENTS

| | | |
|---|---|---|
| 11,531,153 B2 | 12/2022 | Lee et al. |
| 11,658,266 B2 | 5/2023 | Kang et al. |
| 11,841,525 B2 | 12/2023 | Lee et al. |
| 11,949,042 B2 | 4/2024 | Kang et al. |
| 2008/0259642 A1* | 10/2008 | Parker .................. G02B 6/0036 362/612 |
| 2009/0040789 A1 | 2/2009 | Maeda et al. |
| 2020/0335660 A1 | 10/2020 | Kang et al. |
| 2021/0226106 A1 | 7/2021 | Yun et al. |
| 2022/0020897 A1 | 1/2022 | Kang et al. |
| 2022/0146738 A1 | 5/2022 | Lee et al. |
| 2022/0393064 A1 | 12/2022 | Kang et al. |
| 2023/0075367 A1 | 3/2023 | Lee et al. |
| 2023/0317875 A1 | 10/2023 | Kang et al. |

FOREIGN PATENT DOCUMENTS

| | | | |
|---|---|---|---|
| KR | 10-2015-0130809 | 11/2015 | |
| KR | 20190054605 A * | 5/2019 | |
| KR | 10-2019-0132124 | 11/2019 | |
| KR | 10-2020-0112542 | 10/2020 | |
| KR | 10-2020-0112543 | 10/2020 | |
| WO | WO-2019098596 A1 * | 5/2019 | ............... B60Q 3/64 |
| WO | WO 2020/197171 | 10/2020 | |

* cited by examiner

LIGHTING APPARATUS AND LAMP COMPRISING SAME

CROSS-REFERENCE TO RELATED PATENT APPLICATIONS

This application is a U.S. National Stage Application under 35 U.S.C. § 371 of PCT Application No. PCT/KR2021/013663, filed Oct. 6, 2021, which claims priority to Korean Patent Application No. 10-2020-0129102, filed Oct. 7, 2020, whose entire disclosures are hereby incorporated by reference.

TECHNICAL FIELD

The embodiment relates to a lighting apparatus and a lamp including the same.

BACKGROUND ART

Lighting is a device capable of supplying light or controlling the amount of light and is used in various fields. For example, the lighting apparatus may be applied to various fields such as vehicles and buildings to illuminate the interior or exterior. In particular, in recent years, a light emitting device has been used as a light source for lighting. Such the light emitting device, for example, a light emitting diode (LED), has advantages such as low power consumption, semi-permanent lifespan, fast response speed, safety, environmental friendliness compared to conventional light sources such as fluorescent lamps and incandescent lamps. Such light emitting diodes are being applied to various optical assemblies such as various display devices, indoor lights, or outdoor lights. In general, lamps of various colors and shapes are applied to vehicles, and lamps employing light emitting diodes as light sources for vehicles have recently been proposed. For example, the light emitting diode is applied to vehicle headlights, taillights, direction indicators, and the like. However, the light emitting diode has a problem in that the emission angle of emitted light is relatively small. For this reason, when using a light emitting diode as a vehicle lamp, there is a demand for increasing the light emitting area of the lamp. When the lamp includes the light emitting diode, there is a problem in that the performance of the light emitting diode is deteriorated or the uniformity of emitted light is reduced due to heat generated when the light emitting diode emits light. When the lamp includes the light emitting diode, there is a problem in that a hot spot is formed by light emitted from the light emitting diode. In this case, when implementing a linear light source or a surface light source using the lamp, there is a problem in that uniformity characteristics of the light emitting surface are deteriorated. Therefore, a new lighting apparatus and lamp capable of solving the above problems are required.

DISCLOSURE

Technical Problem

An embodiment of the invention provides a lighting apparatus and a lamp having improved luminosity. The embodiment of the invention provides a lighting apparatus and a lamp capable of realizing a uniform linear light source or a surface light source.

Technical Solution

A lighting apparatus according to an embodiment includes a substrate, a plurality of light emitting devices disposed on the substrate, a first reflective layer disposed on the substrate, a resin layer disposed on the first reflective layer, and a second reflective layer disposed on the resin layer, wherein the resin layer includes a first side surface facing light emitting surfaces of the plurality of light emitting devices and a second side surface opposite the first side surface, the first side surface includes a plurality of first reflective surfaces having a convex shape with respect to the light emitting surface of the light emitting devices and at least one second reflective surface having a concave shape with respect to the light emitting surface of the light emitting devices, wherein the plurality of first reflective surfaces are disposed on a region corresponding to each of the plurality of light emitting devices in an optical axis direction, and the second reflective surface is disposed between the plurality of first reflective surfaces, and light emitted through the light emitting surfaces of the light emitting devices may be reflected from the first side surfaces and emitted through the second side surface.

According to an embodiment of the invention, the second reflective surface may be disposed on a region corresponding to a region between the plurality of light emitting devices in the optical axis direction. The first and second reflective surfaces may include curved surfaces. A radius of curvature of the second reflective surface may be smaller than a radius of curvature of the first reflective surface. The first and second reflective surfaces may have horizontal widths defined by a width in a direction perpendicular to the optical axis direction, and the horizontal width of the first reflective surface may be greater than the horizontal width of the second reflective surface. The horizontal width of the first reflective surface may be greater than a horizontal width of the light emitting device. A distance from the light emitting device to the first reflective surface in the optical axis direction may be longer than a distance from the light emitting device to the second side surface in the optical axis direction.

A lighting apparatus according to an embodiment includes a substrate, a plurality of light emitting devices disposed on the substrate, a first reflective layer disposed on the substrate, a resin layer disposed on the first reflective layer, and a second reflective layer disposed on the resin layer, wherein the resin layer includes a plurality of protruding portions projecting from a first side surface facing an emission surface of the light emitting devices, each of the plurality of protruding portions is disposed on a region corresponding to the plurality of light emitting devices in the optical axis direction, each of the protruding portions includes a convex portion having a convex shape with respect to the emission surface of the light emitting devices and an extension portion disposed between the convex portion and the light emitting devices, and light emitted through the emission surfaces may be reflected by the protruding portions and emitted through a second side surface facing the first side surface.

According to the embodiment of the invention, the convex portion and the extension portion may have horizontal widths defined as a width in a direction perpendicular to the optical axis direction, the horizontal width of the extension portion may be constant, and the horizontal width of the convex portion may decrease as the distance from the light emitting device increases. A length of the extension portion in the optical axis direction may be shorter than a length of the convex portion in the optical axis direction. The convex portion may include a first reflective surface disposed on a region corresponding to the light emitting surface of the light emitting device in the optical axis direction and having a convex shape, and the first reflective surface may include a curved surface. The resin layer may include at least one concave portion disposed between the plurality of protruding portions, and the concave portion may be disposed on a region corresponding to a region between the plurality of light emitting devices in the optical axis direction. The concave portion may include a second reflective surface having a concave shape with respect to the light emitting surface of the light emitting device, and the second reflective surface may include a curved surface. A horizontal width of the concave portion may be smaller than a horizontal width of the convex portion. A radius of curvature of the first reflective surface may be greater than a radius of curvature of the second reflective surface.

A lamp according to the embodiment may include a housing having one side open and a receiving space therein, and a lighting apparatus disposed in the receiving space of the housing, and the lighting apparatus may include the above-described lighting apparatus, and the second side surface may be disposed to face the open side of the housing.

According to the embodiment of the invention, a distance of the receiving space in the optical axis direction may be 1 to 1.2 times the distance of the lighting apparatus in the optical axis direction. The distance of the receiving space in the optical axis direction may be shorter than a distance of the lighting apparatus in the optical axis direction by 4 mm or less.

Advantageous Effects

Lighting apparatus and lamps according to embodiment may have improved luminance characteristics. In detail, the lighting apparatus and the lamp may include a protruding portion and a concave portion formed on a first side surface, and light emitted from the light emitting device may be reflected by the protruding portion and the concave portion and emitted in a direction of a second side surface. In this case, the protruding portion and the concave portion may have set first and second direction lengths, curvature radii, and the like. Accordingly, the lighting apparatus may minimize light loss within the device and provide a line light source or a planar light source with high luminance to the second side surface.

A lighting apparatus and a lamp according to an embodiment may have improved uniformity. In detail, the embodiment may emit light in an indirect light method in which the light emitting direction of the lighting apparatus and the light emitting direction of the light emitting device are opposite. Accordingly, the light emitted from the light emitting device may secure a sufficient light guiding distance within the lighting apparatus. Accordingly, the light emitted to the second side surface may have uniform luminance depending on the region of the second side surface, thereby preventing a hot spot or a dark part in which light is concentrated on the second side surface. That is, the lighting apparatus and the lamp according to the embodiment may provide a linear light source or a surface light source having uniform luminance.

A lighting apparatus according to the embodiment may be provided in a rigid or flexible form. Accordingly, the lighting apparatus and the lamp may be provided in various designs and at the same time provide uniform and high luminance light.

BEST MODE

Figure 1:
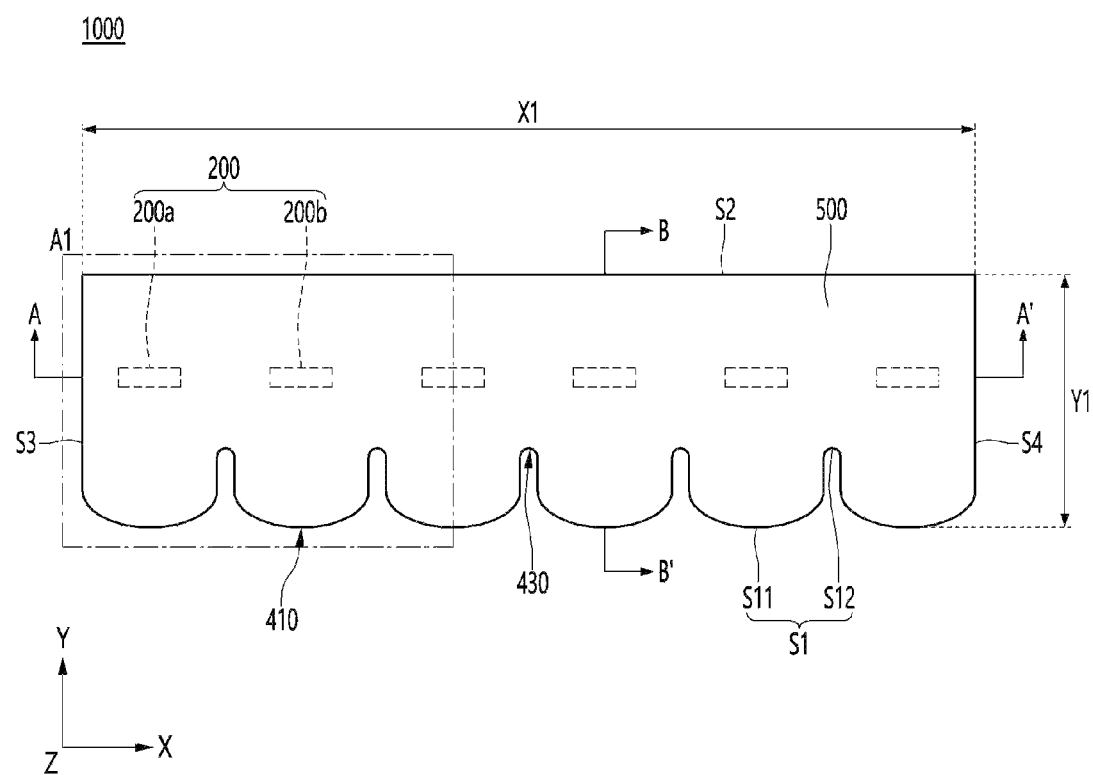
FIG. 1 is a top view of a lighting apparatus according to the embodiment.

Hereinafter, preferred embodiments of the invention will be described in detail with reference to the accompanying drawings. The technical idea of the present invention is not limited to some of the described embodiments, but can be implemented in various different forms, and when it is within the scope of the technical idea of the present invention, one or more of its components may be selectively combined and substituted between embodiments. In addition, terms (including technical and scientific terms) used in the embodiments of the present invention, unless explicitly specifically defined and described, may be interpreted as a meaning that may be generally understood by those skilled in the art to which the present invention belongs, and terms generally used, such as terms defined in the dictionary, may be interpreted in consideration of the context of the related technology. Also, terms used in the embodiments of the present invention are for describing the embodiments and are not intended to limit the present invention. In the present specification, the singular form may include a plural form unless specifically described in the phrase, and may include at least one of all combinations that may be combined as A, B, and C when described as "A and/or at least one (or more than one) of B and C". Also, terms such as first, second, A, B, (a), and (b) may be used to describe components of an embodiment of the present invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The lighting apparatus according to the embodiment may be applied to various lamp devices that require lighting, such as vehicle lamps, household optical assemblies, and industrial optical assemblies. For example, when applied to vehicle lamps, it can be applied to head lamps, side mirror lamps, side maker light, fog lamps, tail lamps, brake lamps, daytime running lamps, vehicle interior lighting, door scarves, rear combination lamps, backup lamps, etc. In addition, when applied to a vehicle lamp, it can be applied to a rear side assistance system (BSD) disposed in a side mirror or A-pillar. In addition, the optical assembly of this invention may be applied to indoor and outdoor advertising devices, display devices, and various electric vehicle fields, as well as all lighting and advertising fields that are currently developed and commercialized or may be implemented according to future technological advances. In addition, the optical assembly of this invention may be applied to indoor and outdoor advertising devices, display devices, and various electric vehicle fields, as well as all lighting and advertising fields that are currently developed and commercialized or may be implemented according to future technological advances.

In addition, prior to the description of the embodiment, a first direction may mean an x-axis direction shown in the drawing, and a second direction may be a direction different from the first direction. For example, the second direction may mean a y-axis direction shown in the drawing as a direction perpendicular to the first direction and may mean an optical axis direction of a light emitting device. Also, the horizontal direction may mean first and second directions, and the vertical direction may mean a direction perpendicular to at least one of the first and second directions. For example, the horizontal direction may refer to the x-axis and y-axis directions of the drawing, and the vertical direction may refer to the z-axis direction of the drawing, perpendicular to the x-axis and y-axis directions.

Figure 2:
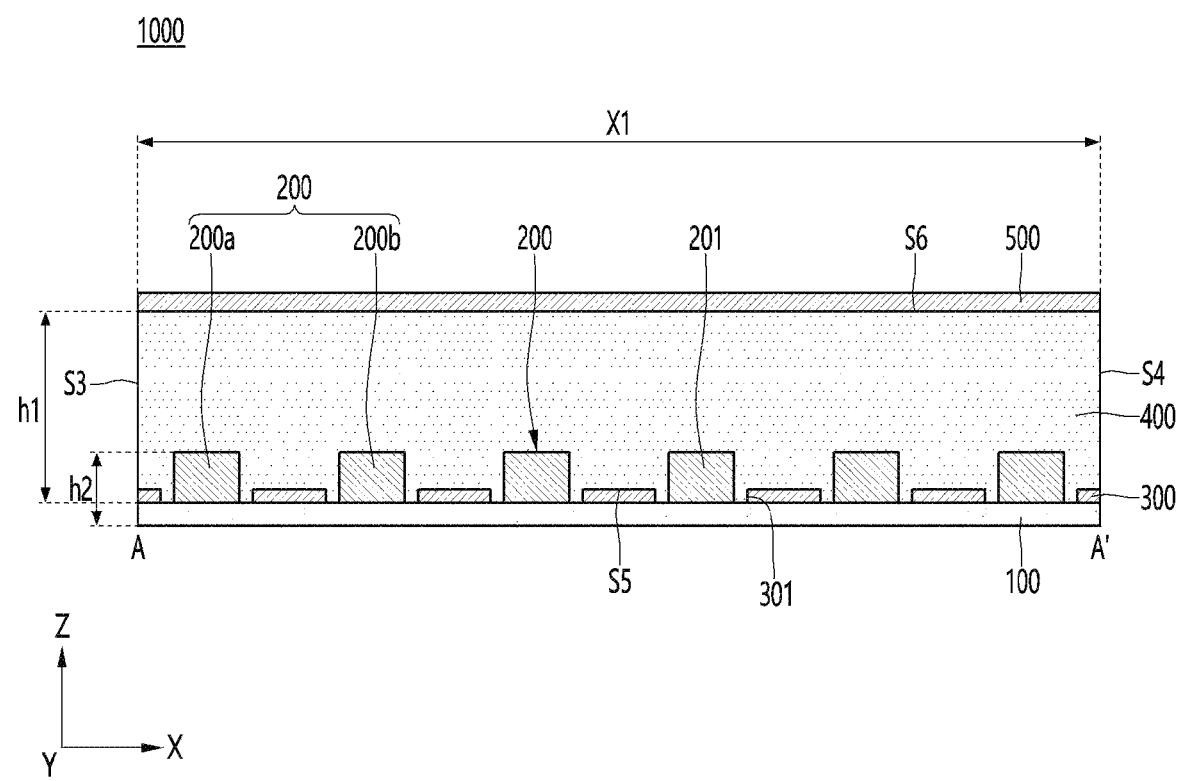
FIG. 2 is a cross-sectional view taken along line A-A' of the lighting apparatus according to FIG. 1.
Figure 3:
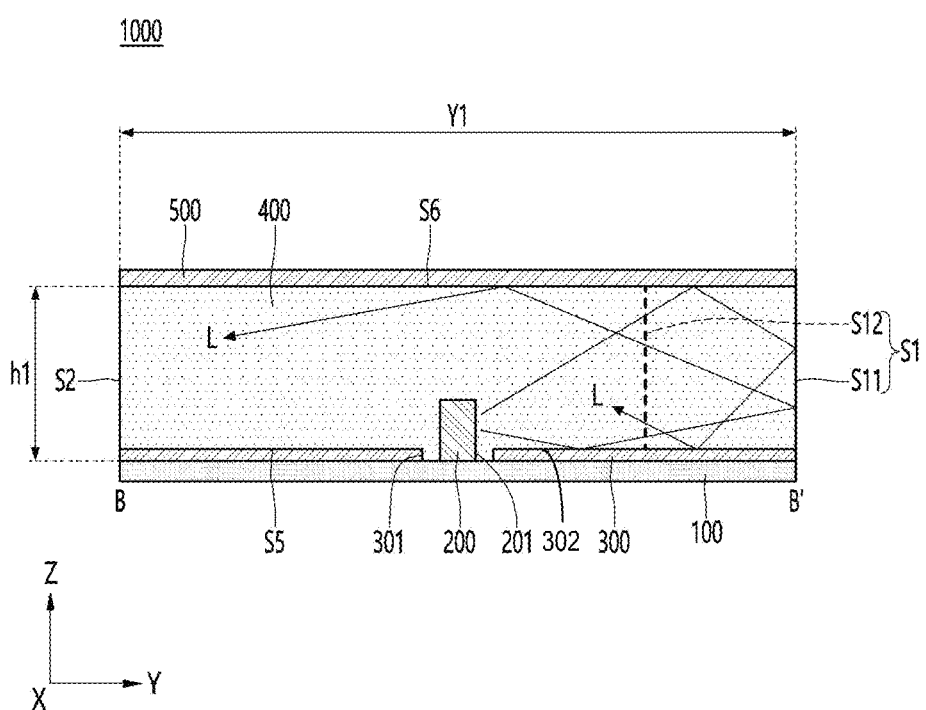
FIG. 3 is a cross-sectional view taken along line B-B' of the lighting apparatus according to FIG. 1.
Figure 4:
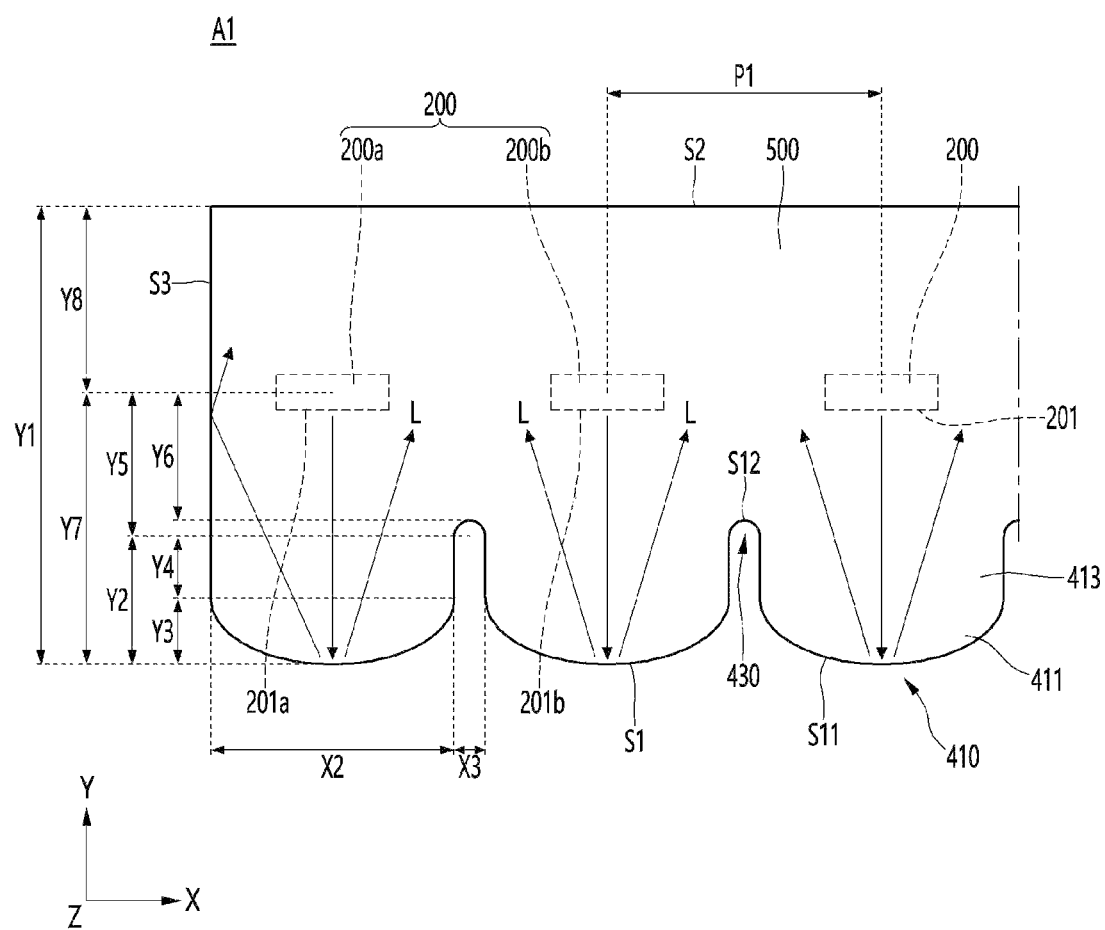
FIG. 4 is an enlarged view illustrating an enlarged region A1 of FIG. 1.

FIG. 1 is a top view of a lighting apparatus according to the embodiment, and FIG. 2 is a cross-sectional view taken along line A-A' of the lighting apparatus according to FIG. 1. In addition, FIG. 3 is a cross-sectional view taken along line B-B' of the lighting apparatus according to FIG. 1, and FIG. 4 is an enlarged view illustrating an enlarged region µl of FIG. 1.

Referring to FIGS. 1 to 4, the lighting apparatus 1000 according to the embodiment may emit light emitted from the plurality of light emitting devices 200 as a linear light source or a surface light source. For example, the lighting apparatus 1000 may include a region where light emitted from the light emitting device 200 is reflected, a diffused region, and a region where light emitted from the light emitting device 200 may be emitted in the form of a line light source or a surface light source.

The lighting apparatus 1000 may be provided as a rigid or flexible module. For example, the lighting apparatus may be flat or flexible in at least one of the first direction (x-axis direction) and the second direction (y-axis direction). The lighting apparatus 1000 emits light to one side of the device and may have a length X1 in a first direction (x-axis direction) and a length Y1 in a second direction (y-axis direction). The length X1 of the lighting apparatus 1000 in the first direction may change according to the number of the light emitting devices 200 arranged in the first direction within the lighting apparatus 1000. For example, the lighting apparatus 1000 may include a plurality of light emitting devices 200, and the length X1 of the lighting apparatus 1000 in the first direction may be about 30 mm or more. Also, the length Y1 of the lighting apparatus 1000 in the second direction may change according to the number of rows of the light emitting devices 200 disposed in the lighting apparatus 1000. For example, the plurality of light emitting devices 200 disposed in the lighting apparatus 1000 may be arranged in one or more rows, and the length Y1 of the lighting apparatus 1000 in the second direction may be about 16 mm or more. In detail, the length Y1 in the second direction may be about 20 mm or more. A length Y1 of the lighting apparatus 1000 in the second direction may be shorter than a length X1 in the first direction. The lighting apparatus 1000 may be defined as a light emitting cell, a lighting module, or a light source module. The lighting apparatus 1000 may include one light emitting cell or a plurality of light emitting cells disposed on a main substrate (not shown) or a substrate 100 to be described later. Here, when a plurality of light emitting cells are disposed on one substrate 100, the main substrate may be omitted.

The lighting apparatus 1000 may include a substrate 100, a light emitting device 200, a first reflective layer 300 and a resin layer 400. The substrate 100 may include a printed circuit board (PCB). The substrate 100 may include, for example, at least one of a resin-based printed circuit board (PCB), a metal core PCB, a flexible PCB, a ceramic PCB, or an FR-4 substrate. When the substrate 100 is disposed as a metal core PCB having a metal layer disposed on the bottom, heat dissipation efficiency of the light emitting device 200 may be improved. In addition, the substrate 100 may include a light-transmitting material. In detail, the substrate 100 may include a material through which light is transmitted through upper and lower surfaces. The substrate 100 may include at least one of PET (polyethylene terephthalate), PS (polystyrene), PI (polyimide), PEN (polyethylene naphthalate), and PC (polycarbonate). The substrate 100 may be electrically connected to the light emitting device 200. The substrate 100 includes a wiring layer (not shown) thereon, and the wiring layer may be electrically connected to the light emitting device 200. When the plurality of light emitting devices 200 are arranged on the substrate 100, the plurality of light emitting devices 200 may be connected in series, parallel, or series-parallel by the wiring layer. The substrate 100 may function as a base member or a support member disposed below the light emitting device 200 and the resin layer 400.

The light emitting device 200 may be disposed on the substrate 100. The light emitting device 200 is a device having a light emitting diode (LED) and may include a package in which a light emitting chip is packaged. The light emitting chip 271 may emit at least one of visible light such as blue, red, green, and yellow, ultraviolet (UV) and infrared rays, and the light emitting device 200 may emit at least one of visible light such as white, blue, red, yellow, and green. At least one of visible light, ultraviolet light, and infrared light may be emitted. The light emitting device 200 may be a side view type having a light emitting surface 201 facing a side of the lighting apparatus 1000. For example, the light emitting surface 201 of the light emitting device 200 may face a side surface of the resin layer 400. An optical axis of the light emitting device 200 may be parallel to the upper surface of the substrate 100.

The plurality of light emitting devices 200 may be disposed on the substrate 100. For example, the plurality of light emitting devices 200 spaced apart in the first direction (x-axis direction) and extending in the first direction may be disposed on the substrate 100. The plurality of light emitting devices 200 may emit linear light. The plurality of light emitting devices 200 may be arranged in at least one row. For example, the plurality of light emitting devices 200 may be arranged in one row as shown in FIG. 1. In this case, the plurality of light emitting devices 200 may include a first light emitting device 200*a* and a second light emitting device 200*b* spaced apart in the first direction. The first light emitting device 200*a* and the second light emitting device 200*b* may be spaced apart by a first pitch P1 defined as an interval in the first direction. Here, the first pitch P1 may mean an interval between the centers of the first light emitting device 200*a* and the second light emitting device 200*b* in the first direction. The first pitch P1 may be about 10 mm or more. In detail, the first pitch P1 may be about 10 mm to about 20 mm. When the first pitch P1 is less than about 10 mm, the required number of lights emitting devices 200 may increase and the uniformity of emitted light may deteriorate. In addition, when the first pitch P1 exceeds about 20 mm, the luminance of emitted light may decrease. Therefore, it is preferable that the first pitch P1 satisfies the above-described range.

In addition, although not shown in the drawings, the plurality of light emitting devices 200 may be arranged in a plurality of rows spaced apart in the second direction (y-axis direction), for example, two rows. In this case, the plurality of light emitting devices arranged in the second row may be arranged at a position corresponding to the region between the plurality of light emitting devices 200 arranged in the first row. For example, the plurality of light emitting devices disposed in the second row may be disposed on a region corresponding to a concave portion 430 to be described later in a second direction. In detail, optical axes of the plurality of light emitting devices disposed in the second row may overlap the apex of the concave portion 430 in the optical axis direction. The plurality of light emitting devices arranged in the second row may be spaced apart at a second pitch (not shown) defined as an interval in the first direction. Here, the second pitch may refer to an interval between centers of the plurality of light emitting devices arranged in the second row in the first direction. The second pitch may be the same as the first pitch P1. In addition, the plurality of light emitting devices 200 spaced apart in the first direction (x-axis direction) in the first row may be disposed so as not to overlap the plurality of light emitting devices 200 spaced apart in the first direction in the second row (y-axis direction). That is, the plurality of light emitting devices 200 arranged in the first row and the plurality of light emitting devices 200 arranged in the second row may be arranged in a zigzag form.

The plurality of light emitting devices 200 may emit light of the same color as each other. For example, the plurality of light emitting devices 200 may emit light of the same wavelength band toward a side surface of the resin layer 400. Alternatively, the plurality of light emitting devices 200 may emit light in different wavelength bands. For example, some of the plurality of light emitting devices 200 may emit light in a first wavelength band, and the rest or other parts may emit light in a second wavelength band different from the first wavelength band. Accordingly, the lighting apparatus 1000 may selectively provide light of one wavelength band or light of various wavelength bands using one device.

The light emitting device 200 may include the light emitting surface 201 from which light is emitted. For example, when the light emitting device 200 is a side view type, the light emitting surface 201 of the light emitting device 200 may face one side of the lighting apparatus 1000. In detail, the light emitting surface 201 may face one side surface (first side surface S1) of the resin layer 400 to be described later. The light emitting surface 201 may refer to a surface emitting light of the highest intensity toward one side of the lighting apparatus 1000. The light emitting surface 201 may be formed as the flat plane and may include a concave or convex surface. The light L emitted from the light emitting device 200 may be emitted in a direction toward one side of the lighting apparatus 1000, in detail, toward one side (first side surface S1) of the resin layer 400. In addition, the emitted light L may be reflected on one side surface of the resin layer 400 to proceed toward the other side surface (second side surface (S2) of the resin layer 400), and may be emitted to the outside of the resin layer 400 through the other side surface (second side surface (S2) of the resin layer 400.

The first reflective layer 300 may be disposed on the substrate 100. The first reflective layer 300 may be disposed between the substrate 100 and the resin layer 400. The first reflective layer 300 may be provided in the form of a film having a metal material or a non-metal material. The first reflective layer 300 may be adhered to the upper surface of the substrate 100. In addition, the first reflective layer 300 may be bonded between the resin layer 400 and the substrate 100, but is not limited thereto. The first reflective layer 300 may have an area smaller than that of the upper surface of the substrate 100. The first reflective layer 300 may be spaced apart from the edge of the substrate 100 and the resin layer 400 may be attached to the substrate 100 on the spaced region of the first reflective layer 300. Accordingly, peeling of the edge portion of the first reflective layer 300 may be prevented. The first reflective layer 300 may include an opening portion 301 in which a lower portion of the light emitting device 200 is disposed. A portion in which the upper surface of the substrate 100 is exposed and the lower portion of the light emitting device 200 is bonded may be disposed in the opening portion 301 of the first reflective layer 300. The size of the opening portion 301 may be the same as or larger than the size of the light emitting device 200, but is not limited thereto. The first reflective layer 300 may have a thickness smaller than that of the substrate 100. For example, the first reflective layer 300 may be provided with a thickness that is about 0.5 to about 1 time the thickness of the substrate 100 to reduce transmission loss of incident light. Also, the first reflective layer 300 may be formed to a thickness smaller than that of the light emitting device 200. The thickness of the first reflective layer 300 may be about 0.2 mm to about 0.4 mm. Through the opening portion 301 of the first reflective layer 300, the lower portion of the light emitting device 200 may be inserted into the first reflective layer 300 and the upper portion of the light emitting device 200 may protrude through the opening portion 301. The light emitting surface 201 of the light emitting device 200 may be provided in a direction perpendicular to the upper surface of the first reflective layer 300.

The first reflective layer 300 may include a metallic material or a non-metallic material. The metallic material may include a metal such as aluminum, silver, or gold. The non-metallic material may include a plastic material or a resin material. The plastic material may be any one selected from the group consisting of polyethylene, polypropylene, polystyrene, polyvinyl chloride, biphenyl chloride, polyethylene terephthalate, polyvinyl alcohol, polycarbonate, polybutylene terephthalate, polyethylene naphthalate, polyamide, polyacetal, polyphenylene ether, polyamideimide, polyetherimide, polycarbonate, polyether ether ketone, polyimide, polytetrafluoroethylene, a liquid crystal polymer, a fluorine resin, a copolymer thereof, and a mixture thereof. As the resin material, a reflective material such as $TiO_2$, $Al_2O_3$, or $SiO_2$ may be added to silicon or epoxy. The first reflective layer 300 may be implemented as a single layer or multiple layers, and light reflection efficiency may be improved by such a layer structure. The first reflective layer 300 according to the embodiment may increase the amount of light so that the light is emitted with a uniform distribution by reflecting the incident light. Here, the first reflective layer 300 may be omitted when a highly reflective material is coated on the upper surface of the substrate 100.

The first reflective layer 300 may include a plurality of reflectors (not shown). The reflector may be a bubble such as air or a medium having the same refractive index as air. The first reflective layer 300 may reflect light incident by the plurality of reflectors or refract it in a different direction. The first reflective layer 300 may include a reflective pattern 302. The reflective pattern may have a plurality of dot shapes. The plurality of reflective patterns may be disposed on an upper surface of the first reflective layer 300. For example, the plurality of reflective patterns may be disposed in a form protruding from the upper surface of the first reflective layer 300. The plurality of reflective patterns may be spaced apart from the light emitting device 200 and disposed in an emission direction of light emitted from the light emitting device 200. The plurality of reflective patterns may be formed on the first reflective layer 300 through printing. The plurality of reflective patterns may include reflective ink. The plurality of reflective patterns may be printed with a material including any one of TiO2, CaCO3, BaSO4, Al2O3, Silicon, and PS. A planar shape of each of the plurality of reflective patterns may be one selected from circular, elliptical, and polygonal shapes. In addition, each of the plurality of reflective patterns may have a hemispherical cross section or a polygonal shape. A material of the plurality of reflective patterns may be white. The dot pattern density of the plurality of reflective patterns may increase as the distance from the light emitting device 200 increases. In detail, the density of the reflective pattern per unit area may increase as the distance from the light emitting surface 201 of the light emitting device 200 increases. For example, the density of the reflective pattern per unit area may increase from the light emitting surface 201 toward the protruding portion 410 to be described later. In addition, the size of the plurality of reflective patterns may change as the distance from the light emitting surface 201 of the light emitting device 200 increases. In detail, the width of the plurality of reflective patterns in a horizontal direction may increase as the distance from the light emitting surface 201 of the light emitting device 200 increases. For example, the size of the reflective pattern may increase from the light emitting surface 201 toward the protruding portion 410.

The plurality of reflective patterns may be further disposed on a rear surface of the light emitting device 200 opposite to the front surface as well as a front surface of the light emitting device 200 facing the protruding portion 410. In detail, the reflective pattern may be further disposed between the light emitting device 200 and the second side surface S2 of the resin layer 400. Accordingly, it may be reflected on the first side surface S1 and more effectively provided in the direction of the second side surface S2. The plurality of reflective patterns may be disposed on the movement path of light emitted from the light emitting device 200 and/or the movement path of light emitted from the light emitting device 200 and reflected by other components, thereby improving light reflectivity and reducing light loss.

The resin layer 400 may be disposed on the substrate 100. The resin layer 400 may face the substrate 100. The resin layer 400 may be disposed on the entire upper surface or a partial region of the substrate 100. The area of the lower surface S5 of the resin layer 400 may be equal to or larger than the area of the upper surface of the substrate 100. The resin layer 400 may be formed of a transparent material. The resin layer 400 may include a resin material such as silicone or epoxy. The resin layer 400 may include a thermosetting resin material, for example, PC, OPS, PMMA, PVC, or the like may be selectively included. The resin layer 400 may be formed of glass, but is not limited thereto. For example, a resin material containing urethane acrylate oligomer as a main material may be used as the main material of the resin layer 400. For example, a mixture of a synthetic oligomer, urethane acrylate oligomer, and a polyacrylic polymer type may be used. Of course, a monomer in which IBOA (isobornyl acrylate), HPA (hydroxyl propyl acrylate), 2-HEA (2-hydroxyethyl acrylate), and the like, which are low-boiling dilution-type reactive monomers, may be further included, and a photoinitiator (e.g., 1-hydroxycyclohexyl phenyl-ketone) or an antioxidant may be mixed as an additive.

Since the resin layer 400 is provided as a layer for guiding light with resin, it may be provided with a thinner thickness than in the case of glass and may be provided as a flexible plate. The resin layer 400 may emit a point light source emitted from the light emitting device 200 in the form of a line light source or a surface light source. The resin layer 400 may emit light by diffusing light emitted from the light emitting device 200. For example, a bead (not shown) may be included in the resin layer 400, and the bead diffuses and reflects incident light to increase the amount of light. The beads may be disposed in a range of 0.01 to 0.3% based on the weight of the resin layer 400. The bead may be formed of any one selected from silicon, silica, glass bubble, PMMA (Polymethyl methacrylate), urethane, Zn, Zr, $Al_2O_3$, and acryl, and a particle diameter of the bead may be in a range of about 1 μm to about 20 μm, but is not limited thereto.

Since the resin layer 400 is disposed on the light emitting device 200, the light emitting device 200 may be protected and loss of light emitted from the light emitting device 200 may be reduced. The light emitting device 200 may be buried under the resin layer 400.

The resin layer 400 may contact the surface of the light emitting device 200 and may contact the emission surface of the light emitting device 200. A portion of the resin layer 400 may be disposed in the opening portion 301 of the first reflective layer 300. A portion of the resin layer 400 may contact the upper surface of the substrate 100 through the opening portion 301 of the first reflective layer 300. Accordingly, as a part of the resin layer 400 comes into contact with the substrate 100, the first reflective layer 300 may be fixed between the resin layer 400 and the substrate 100.

The thickness h1 of the resin layer 400 may be a distance from the upper surface of the substrate 100 to the lower surface of the second reflective layer 500. The thickness h1 of the resin layer 400 may be a distance from an upper surface of the first reflective layer 300 to a lower surface of the second reflective layer 500. A portion of the resin layer 400 may extend through the opening portion 301 of the first reflective layer 300. The thickness h1 of the resin layer 400 may be less than twice the thickness of the light emitting device 200. The resin layer 400 may be formed to a thickness greater than that of the light emitting device 200. The thickness h1 of the resin layer 400 may be less than twice the thickness of the light emitting device 200. Also, the thickness h1 of the resin layer 400 may be about 0.8 times or less than the total thickness of the lighting apparatus 1000. In detail, the thickness of the resin layer 400 may be about 0.4 to 0.8 times the total thickness of the lighting apparatus 1000. For example, the thickness h1 of the resin layer 400 may be about 1 mm or more. In detail, the thickness h1 of the resin layer 400 may be about 1 mm to about 10 mm. In more detail, the thickness h1 of the resin layer 400 may be about 1 mm to about 2 mm. When the thickness h1 of the resin layer 400 is less than about 1 mm, light emitted from the light emitting device 200 may not be effectively guided. Accordingly, it may be difficult for the light source module 1000 to implement a uniform surface light source. In addition, when the thickness h1 of the resin layer 400 is less than about 1 mm, it may be difficult to effectively protect the light emitting device 200 and the adhesive force between the substrate 100 and the first reflective layer 300 may be lowered. In addition, when the thickness h1 of the resin layer 400 exceeds about 10 mm, light loss may occur due to an increase in the movement path of light emitted from the light emitting device 200, and the luminance of the surface light source may decrease. Accordingly, the thickness h1 of the resin layer 400 preferably satisfies the above-described range, and may be about 1.5 mm to about 3 mm in consideration of light efficiency and ductility characteristics of the lighting apparatus 1000. A height h2 from the lower surface of the substrate 100 to the upper surface of the light emitting device 200 may be about 2.5 mm or less. In detail, a height h2 from the lower surface of the substrate 100 to the upper surface of the light emitting device 200 may be about 2 mm or less. More specifically, the height h2 may be about 1.5 mm to about 2 mm. It is preferable that the height h2 from the lower surface of the substrate 100 to the upper surface of the light emitting device 200 satisfies the above-described range to reduce the entire height of the lighting apparatus 1000 when providing a line light source or a surface light source. The resin layer 400 may include a plurality of side surfaces S1, S2, S3 and S4, a protruding portion 410, and a concave portion 430, which will be described in more detail in a paragraph to be described later.

The lighting apparatus 1000 may further include a second reflective layer 500. The second reflective layer 500 may be disposed on the resin layer 400. The second reflective layer 500 may be provided in the form of a film having a metal material or a non-metal material. The second reflective layer 500 may be adhered to an upper surface of the resin layer 400. The second reflective layer 500 may have a shape corresponding to the upper surface S6 of the resin layer 400. Also, the second reflective layer 500 may have an area corresponding to the upper surface S6 of the resin layer 400. For example, the lengths of the second reflective layer 500 in the first and second directions may be the same as those of the upper surface S6 of the resin layer 400 in the first and second directions.

The thickness of the second reflective layer 500 may be smaller than that of the substrate 100. For example, the second reflective layer 500 may be provided with a thickness that is about 0.5 to about 1 time the thickness of the substrate 100 to reduce transmission loss of incident light. Also, the second reflective layer 500 may be formed to a thickness smaller than that of the light emitting device 200. The second reflective layer 500 may have a thickness of about 0.2 mm to about 0.4 mm. The second reflective layer 500 may have the same thickness as the first reflective layer 300.

The second reflective layer 500 may include a metallic material or a non-metallic material. The metallic material may include a metal such as aluminum, silver, or gold. The non-metallic material may include a plastic material or a resin material. The plastic material may be any one selected from the group consisting of polyethylene, polypropylene, polystyrene, polyvinyl chloride, biphenyl chloride, polyethylene terephthalate, polyvinyl alcohol, polycarbonate, polybutylene terephthalate, polyethylene naphthalate, polyamide, polyacetal, polyphenylene ether, polyamideimide, polyetherimide, polyether ether ketone, polyimide, polytetrafluoroethylene, a liquid crystal polymer, a fluorine resin, a copolymer thereof, and a mixture thereof. As the resin material, a reflective material such as $TiO_2$, $Al_2O_3$, or $SiO_2$ may be added to silicon or epoxy. The first reflective layer 300 may be implemented as a single layer or multiple layers, and light reflection efficiency may be improved by such a layer structure. The second reflective layer 500 according to the embodiment may increase the amount of light so that the light is uniformly distributed by reflecting incident light. Here, the second reflective layer 500 may be omitted when the housing 600 to be described later includes a light reflective material.

The second reflective layer 500 may include a plurality of reflectors (not shown). The reflector may be a bubble such as air or a medium having the same refractive index as air. The second reflective layer 500 may reflect light incident by the plurality of reflectors or refract it in a different direction.

The light emitting device 200 may be disposed between vertically facing reflective layers, such as, the first reflective layer 300 and the second reflective layer 500 and may be sealed by the resin layer 400. Accordingly, light L emitted from the light emitting device 200 toward one side surface (first side surface S1) of the lighting apparatus 1000 is not emitted to the lower surface S5 and the upper surface S6 of the resin layer 400, and may be reflected and/or guided to the resin layer 400, the first reflective layer 300, and the second reflective layer 500, and the like to be emitted toward the other side surface S2 of the lighting apparatus 1000.

The resin layer 400 may include a plurality of outer surfaces. For example, the resin layer 400 may include a first side surface S1, a second side surface S2, a third side surface S3, and a fourth side surface S4 disposed between the lower surface S5 and the upper surface S6. The first side surface S1 may be a surface facing the light emitting devices 200. In detail, the first side surface S1 may be a surface facing the light emitting surfaces 201 of the light emitting devices 200 in an optical axis direction (second direction (y axis direction)) of the light emitting devices 200. That is, the light L emitted through the light emitting surfaces 201 of the light emitting devices 200 may be provided to the first side surface S1. The second side surface S2 may be a surface opposite to the first side surface S1 based on the lower surface S5 and the upper surface S6 of the resin layer 400. The second side surface S2 is a surface facing the first side surface S1 in the second direction, and may be a surface facing the rear surface of the light emitting devices 200. The second side surface S2 is a light exit surface of the lighting apparatus 1000 and may extend in the first direction (x-axis direction). The second side surface S2 may be provided flat in the vertical direction (z-axis direction). In addition, the second side surface S2 may include a curved surface convex or concave with respect to the vertical direction, and may have a shape inclined at a predetermined inclination angle with respect to the lower surface S5 and the upper surface S6 of the resin layer 400. The third side surface S3 may be disposed between the first side surface S1 and the second side surface S2. In detail, the third side surface S3 may be a side surface connecting one end of the first side surface S1 and one end of the second side surface S2. The fourth side surface S4 may be disposed between the first side surface S1 and the second side surface S2. In detail, the fourth side surface S4 may be a side surface connecting the other end opposite to one end of the first side surface S1 and the other end opposite to one end of the second side surface S2. The fourth side surface S4 may be a surface opposite to the third side surface S3 with respect to the lower surface S5 and the upper surface S6 of the resin layer 400, and may face the third side surface S3 in the first direction.

The first side surface S1 may have a length corresponding to that of the second side surface S2 in the first direction (x-axis direction). For example, the length of the first side surface S1 in the first direction may be the same as the length of the second side surface S2 in the first direction. Lengths of the first side surface S1 and the second side surface S2 in the first direction may correspond to the length X1 of the lighting apparatus 1000 in the first direction. In addition, the length of the first side surface S1 in the vertical direction (z-axis direction) may be the same as the length of the second side surface S2 in the vertical direction. In addition, the planar area of the first side surface S1 may be different from that of the second side surface S2. For example, the plane area of the first side surface S1 may be larger than that of the second side surface S2. The third side surface S3 may correspond to the fourth side surface S4. For example, the third side surface S3 may have the same length in the second direction (y-axis direction) and the same length in the vertical direction as the fourth side surface S4. Lengths of the third side surface S3 and the fourth side surface S4 in the second direction may correspond to the length Y1 of the lighting apparatus 1000 in the second direction. In addition, lengths of the third side surface S3 and the fourth side surface S4 in the second direction may be longer than lengths of the third side surface S3 and the fourth side surface S4 in the vertical direction. In addition, the third side surface S3 and the fourth side surface S4 may have planar shapes corresponding to each other and may be provided on the same plane. Lengths of the first side surface S1 and the second side surface S2 in the first direction may be different from lengths of the third side surface S3 and the fourth side surface S4 in the second direction. For example, lengths of the first side surface S1 and the second side surface S2 in the first direction may be longer than lengths of the third side surface S3 and the fourth side surface S4 in the second direction. Also, lengths of the first to fourth side surfaces S1, S2, S3, and S4 in a vertical direction may be equal to each other. Here, lengths of the first side surface S1 and the second side surface S2 in the first direction may correspond to lengths X1 of the lighting apparatus 1000, and may correspond to lengths of the third side surface S3 and the fourth side surface S4 in the second direction Y1 of the lighting apparatus 1000.

The first side surface S1 is a surface facing the light emitting surface 201 of the light emitting device 200 and may reflect light emitted through the light emitting surface 201. That is, the first side surface 51 may be a side surface having a shape or a concavo-convex structure for reflecting light emitted from the light emitting device 200 in a set direction. In detail, the resin layer 400 may include a plurality of protruding portions 410 protruding from the first side surface S1. The protruding portion 410 may have a shape extending in the direction of the optical axis of the light emitting device 200. The plurality of protruding portions 410 may reflect light emitted from the light emitting surface 201, and may have a shape protruding in a second direction than an imaginary first straight line (not illustrated) connecting ends of the third side surface S3 and the fourth side surface S4.

The plurality of protruding portions 410 may be disposed on regions corresponding to the plurality of light emitting devices 200. In detail, the protruding portion 410 may be disposed on a region corresponding to the light emitting device 200 in the optical axis direction (second direction (y-axis direction)) of the light emitting device 200. In more detail, an apex of the protruding portion 410 may overlap an optical axis of each of the light emitting devices 200 in the second direction. The plurality of protruding portions 410 may be provided in a number corresponding to that of the light emitting devices 200. In detail, the protruding portions 410 may be provided in the same number as the light emitting devices 200. That is, the protruding portions 410 may be matched and arranged one-to-one on the regions corresponding to the light emitting devices 200. The plurality of protruding portions 410 may be spaced apart in the first direction and may have shapes corresponding to each other. For example, a pitch between adjacent protruding portions 410 may correspond to a pitch of the light emitting devices 200. In detail, an interval in a first direction between apexes of the plurality of protruding portions 410 disposed adjacent to each other may correspond to the first pitch P1. The plurality of protruding portions 410 may have the same lengths X2 in the first direction and lengths Y2 in the second direction. Here, the length X2 of the protruding portion 410 in the first direction may mean the maximum length of the protruding portion 410 in the first direction. A length X2 of the protruding portion 410 in the first direction may be longer than a length of the light emitting device 200 in the first direction. Also, the length X2 of the protruding portion 410 in the first direction may be greater than the thickness h1 of the resin layer 400.

For example, the length X2 of the protruding portion 410 in the first direction may be about 7 mm to about 20 mm. In detail, the length X2 of the protruding portion 410 in the first direction may be about 10 mm to about 18 mm. When the length X2 of the protruding portion 410 in the first direction is less than about 7 mm, light emitted from one light emitting device 200 may not be effectively provided to the protruding portion 410 disposed on a corresponding region. Accordingly, the overall luminance of the lighting apparatus 1000 may decrease, and the luminance of the light L emitted to the second side surface S2 may not be uniform depending on the region. In addition, when the length X2 of the protruding portion 410 in the first direction exceeds about 20 mm, the light L emitted from the light emitting device 200 may be effectively provided to the protruding portion 410, but the first pitch P1 between the plurality of light emitting devices 200 may increase, and thus the total brightness of the lighting apparatus 1000 may decrease. Therefore, it is preferable that the length X2 of the protruding portion 410 in the first direction satisfies the above-described range in consideration of the beam angle, luminance characteristics, and reflection characteristics of the light emitting device 200. A length Y2 of the protruding portion 410 in the second direction may be shorter than a length X2 of the protruding portion 410 in the first direction. For example, the length Y2 of the protruding portion 410 in the second direction may be about 3 mm to about 12 mm. In detail, the length Y2 of the protruding portion 410 in the second direction may be about 5 mm to about 10 mm. Here, the length Y2 of the protruding portion 410 in the second direction may mean a distance from the imaginary first straight line to the apex of the protruding portion 410 in the second direction. When the second direction length Y2 of the protruding portion 410 is less than about 3 mm, the total luminance of the lighting apparatus 1000 may increase, but the luminance of the light L emitted to the second side surface S2 may not be uniform according to a region. In addition, when the second directional length Y2 of the protruding portion 410 exceeds about 12 mm, the light L emitted through the lighting apparatus 1000 may have uniform luminance regardless of the region, but the overall luminance may decrease due to an increase in the movement path of light. Therefore, it is preferable that the length Y2 of the protruding portion 410 in the second direction satisfies the above-described range in consideration of luminance characteristics and preventing formation of dark portions on the second side surface S2 due to uneven light.

Each of the plurality of protruding portions 410 may include a convex portion 411 and an extension portion 413. The convex portion 411 may be a region having a convex shape with respect to the light emitting surface 201 of the light emitting device 200 among the protruding portions 410. In detail, the convex portion 411 may have a downwardly convex shape (refer to FIG. 4.) with respect to the imaginary first straight line. For example, the convex portion 411 may have at least one shape of a convex semicircular shape, a semielliptical shape, and an aspheric shape with respect to the light emitting surface 201 when viewed from above. The convex portion 411 may have a length Y3 in the first direction and a length Y3 in the second direction. In detail, the maximum length of the convex portion 411 in the first direction may correspond to the length X2 of the protruding portion 410 in the first direction. Also, the length Y3 of the convex portion 411 in the second direction may be shorter than the maximum length of the convex portion 411 in the first direction. For example, the length Y3 of the convex portion 411 in the second direction may be about 2 mm to about 8 mm. In detail, the length Y3 of the convex portion 411 in the second direction may be about 3 mm to about 6 mm. The convex portion 411 may include a first reflective surface S11 defined as an outer surface. The first reflective surface S11 is an outer surface of the protruding portion 410 and may be a surface constituting the first side surface S1. The first reflective surface S11 may be disposed on a region corresponding to the light emitting device 200 in the second direction, which is the optical axis direction. For example, an apex of the first reflective surface S11 may overlap an optical axis of the light emitting device 200 in a second direction.

The first reflective surface S11 may include a curved surface as the convex portion 411 has the above-described shape. The first reflective surface S11 may be provided as a curved surface having a set radius of curvature over the entire area. For example, the radius of curvature of the first reflective surface S11 may be about 4 mm to about 15 mm. In detail, the radius of curvature of the first reflective surface S11 may be about 5 mm to about 10 mm. When the radius of curvature of the first reflective surface S11 is less than about 4 mm, it may be difficult to effectively reflect the light incident on the protruding portion 410 toward the second side surface S2. In addition, when the radius of curvature of the first reflective surface S11 exceeds about 15 mm, the angle of light reflected through the first reflective surface S11 is relatively small, so the luminance of light emitted to the second side surface S2 may be uneven depending on the region. Therefore, it is preferable that the radius of curvature of the first reflective surface S11 satisfies the above-described range. That is, the convex portion 411 includes the first reflective surface S11 including a curved surface, and a horizontal width defined as a first direction (x-axis direction) length of the convex portion 411 may vary according to a distance in the optical axis direction to the light emitting device 200. For example, the horizontal width of the convex portion 411 may decrease as the distance from the light emitting device 200 increases. In detail, the horizontal width of the convex portion 411 may decrease as the distance from the light emitting device 200 in the optical axis direction (second direction (y-axis direction)) increases. That is, the horizontal width defined as the length of the first reflective surface S11 in the first direction may decrease as the distance from the light emitting device 200 in the optical axis direction increases.

The extension portion 413 may be disposed between the light emitting device 200 and the convex portion 411. When viewed from above, the extension portion 413 may have a polygonal shape, for example, a quadrangular shape. The extension portion 413 may have a length Y4 in a first direction and a length Y4 in a second direction. A length of the extension portion 413 in the first direction may correspond to a length of the convex portion 411 in the first direction. That is, the length of the extension portion 413 in the first direction may correspond to the length X2 of the protruding portion 410 in the first direction. The length of the extension portion 413 in the first direction may be constant without changing. In detail, the horizontal width defined as the length of the extension portion 413 in the first direction may be constant regardless of the distance between the light emitting devices 200 and the optical axis direction (second direction). A length Y4 of the extension portion 413 in the second direction may be shorter than a length Y3 of the convex portion 411 in the second direction. A length Y4 of the extension portion 413 in the second direction may be shorter than a length of the extension portion 413 in the first direction. For example, the length Y4 of the extension portion 413 in the second direction may be about 1 mm to about 4 mm. In detail, the length Y4 of the extension portion 413 in the second direction may be about 2 mm to about 4 mm. Here, the length Y4 of the extension portion 413 in the second direction may mean a distance from the imaginary first straight line to a boundary between the convex portion 411 and the extension portion 413 in the second direction. In addition, the sum of the second direction length Y4 of the extension portion 413 and the second direction length Y3 of the convex portion 411 may satisfy the second direction length Y2 of the protruding portion 410.

The light emitting device 200 may be spaced apart from the protruding portion 410, for example, the extension portion 413 in the second direction. In this case, a length Y5 in the second direction from the light emitting device 200 to the extension portion 413 may be longer than a length Y2 of the protruding portion 410 in the second direction. In detail, a length Y5 in the second direction from the light emitting device 200 to the extension portion 413 may be about 1.05 times to about 1.5 times the length Y2 of the protruding portion 410 in the second direction. In more detail, the length Y5 from the light emitting device 200 to the extension portion 413 in the second direction may be about 1.1 to about 1.3 times the length Y2 of the protruding portion 410 in the second direction. Here, the second direction length Y5 from the light emitting device 200 to the extension portion 413 may mean a second direction length from the center of the light emitting device 200 to the extension portion 413.

For example, the length Y5 from the light emitting device 200 to the extension portion 413 in the second direction may be about 5 mm to about 14 mm. In detail, the length Y5 from the light emitting device 200 to the extension portion 413 in the second direction may be about 6 mm to about 12 mm. When the length Y5 is less than about 5 mm, the light emitted from the light emitting device 200 may not be effectively provided to the first reflective surface S11 of the convex portion 411. In detail, the amount of light incident to the extension portion 413 may increase due to the relatively short length Y5, and the number of reflections of light emitted from the light emitting device 200 may increase.

That is, the total luminance of the lighting apparatus 1000 may decrease due to frequent reflection in the lighting apparatus 1000. In addition, when the length Y5 exceeds about 14 mm, the light emitted from the light emitting device 200 may not be effectively provided to the protruding portion 410 corresponding to the light emitting device 200 in the second direction. Accordingly, the overall luminance of the lighting apparatus 1000 may decrease, and the luminance of the light L emitted to the second side surface S2 may not be uniform depending on the region.

Therefore, it is preferable that the second direction length Y5 from the light emitting device 200 to the extension portion 413 satisfies the above-described range considering luminance and uniformity of emitted light, and preferably satisfies the above-described ration with the second direction length Y2 of the protruding portion 410. The extension portion 413 may include a plurality of outer surfaces. The outer surface of the extension portion 413 may reflect the light emitted from the light emitting device 200 toward the first reflective surface S11. In addition, the outer surface of the extension portion 413 may reflect the light reflected by the first reflective surface S11 toward the second side surface S2. In this case, one outer surface of the extension portion 413 closest to the third side surface S3 may be disposed on the same plane as the third side surface S3. In addition, one outer surface of the extension portion 413 closest to the fourth side surface S4 may be disposed on the same plane as the fourth side surface S4.

The resin layer 400 may include at least one concave portion 430 having a concave shape on the first side surface S1. The concave portion 430 may reflect light emitted from the light emitting surface 201 of the light emitting device 200 and may have a concave shape in the second direction rather than the imaginary first straight line. For example, the concave portion 430 may have a concave shape in the direction of the second side surface S2 based on the first straight line, that is, an upward concave shape (refer to FIG. 4.). The concave portion 430 may be disposed between the plurality of protruding portions 410. The concave portion 430 may be disposed between two protruding portions 410 adjacent to each other in the first direction (x-axis direction) to connect the two protruding portions 410. The concave portion 430 may have at least one shape of a semicircular shape concave with respect to the light emitting surface 201 when viewed from above, a semielliptical shape, and an aspheric shape.

The concave portion 430 may be disposed in a region that does not correspond to the light emitting device 200. For example, the concave portion 430 may be disposed in a region that does not correspond to the light emitting device 200 in the optical axis direction (second direction (y axis direction)) of the light emitting device 200. In detail, the concave portion 430 may be disposed on a region corresponding to a region between the plurality of light emitting devices 200 in the optical axis direction. The apex of the concave portion 430 may overlap a center of a region between the plurality of light emitting devices 200 in the optical axis direction. The number of concave portions 430 may be different from the number of protruding portions 410. The number of concave portions 430 may be less than the number of protruding portions 410. In detail, the number of the concave portions 430 may be less than the number of the protruding portions 410 and the light emitting devices 200 by one.

When three or more of the plurality of protruding portions 410 are disposed, two or more of the concave portions 430 may be provided. In this case, the plurality of concave portions 430 may have shapes that are spaced apart in the first direction and correspond to each other. For example, the plurality of concave portions 430 may have the same length X3 in the first direction and the same length in the second direction. A length X3 of the concave portion 430 in the first direction may be shorter than a length X2 of the protruding portion 410 in the first direction. The length X3 of the concave portion 430 in the first direction may be shorter than the first pitch P1. That is, the length X3 of the concave portion 430 in the first direction may be shorter than the lengths of the convex portion 411 and the concave portion 430 in the first direction. Also, the length X3 of the concave portion 430 in the first direction may be shorter than the length Y2 of the protruding portion 410 in the second direction. In addition, the length X3 of the concave portion 430 in the first direction may be shorter than the length Y3 of the convex portion 411 in the second direction and the length Y4 of the extension portion 413 in the second direction. A length X3 of the concave portion 430 in the first direction may be the shortest distance between the protruding portions 410 spaced apart in the first direction.

For example, the length X3 of the concave portion 430 in the first direction may be about 0.5 mm to about 5 mm. In detail, the length X3 of the concave portion 430 in the first direction may be about 1 mm to about 3 mm. When the first direction length X3 of each of the concave portions 430 is less than about 0.5 mm, the distance between the protruding portions 410 may be narrow, and thus light emitted from the light emitting devices 200 may not be effectively provided to the protruding portions 410 corresponding to the light emitting devices 200 in the second direction. Accordingly, the luminance of the light L emitted to the second side surface S2 may not be uniform depending on the region. In addition, when the length X3 of each of the concave portions 430 in the first direction exceeds about 5 mm, the first pitch P1 between the plurality of light emitting devices 200 may increase, and the total luminance of the lighting apparatus 1000 may decrease, and a dark portion may be formed on the second side S2 with a non-uniform light. Accordingly, the length X3 of the concave portion 430 in the first direction preferably satisfies the above-described range.

A length of the concave portion 430 in the second direction may be shorter than a length X3 of the concave portion 430 in the first direction. In detail, the length of the concave portion 430 in the second direction may be about 0.3 to about 0.7 times the length X3 of the concave portion 430 in the first direction. For example, the length of the concave portion 430 in the second direction may be about 0.5 mm to about 3 mm. In detail, the length of the concave portion 430 in the second direction may be about 0.5 mm to about 2 mm. Here, the length of the concave portion 430 in the second direction may mean a distance from the imaginary first straight line to an apex of the concave portion 430 in the second direction. When the length of the concave portion 430 in the second direction does not satisfy the above-described range or the above-described ratio with the first direction length X3, the light L emitted to the second side surface S2 may not have uniform luminance depending on the region. That is, a dark portion having relatively low luminance may be formed on the second side surface S2. Accordingly, it is preferable that the second direction of the concave portion 430 satisfies the above-described range and the above-described ratio with the length X3 in the first direction.

The concave portion 430 may be spaced apart from the light emitting device 200 in a second direction, and in this case, the second direction length Y6 from the light emitting device 200 to the concave portion 430 may be longer than the second direction length Y2 of the protruding portion 410. In detail, a length Y6 in the second direction from the light emitting device 200 to the concave portion 430 may be about 1.01 to 1.2 times the length Y2 of the protruding portion 410 in the second direction. Here, the second direction length Y6 from the light emitting device 200 to the concave portion 430 may mean a second direction length from the center of the light emitting device 200 to the apex of the concave portion 430.

For example, the length Y6 in the second direction from the light emitting device 200 to the concave portion 430 may be about 3.5 mm to about 13 mm. In detail, the length Y6 in the second direction from the light emitting device 200 to the concave portion 430 may be about 5.5 mm to about 11 mm. When the second direction length Y6 from the light emitting device 200 to the concave portion 430 is less than about 3.5 mm, the effect of reflecting light emitted from the light emitting device 430 may be insignificant. In addition, when the second direction length Y6 from the light emitting device 200 to the concave portion 430 exceeds about 13 mm, the light emitted from the light emitting device 200 may not be effectively provided to the protruding portion 410 corresponding to the second direction. Accordingly, the overall luminance of the lighting apparatus 1000 may decrease, and the luminance of the light L emitted to the second side surface S2 may not be uniform depending on the region. Therefore, it is preferable that the length Y6 in the second direction from the light emitting device 200 to the concave portion 430 satisfies the above range in consideration of the luminance and the uniformity of emitted light. It is preferable to satisfy the above-mentioned ratio with the length Y2 in the second direction.

The concave portion 430 may include a second reflective surface S12 defined as an outer surface. The second reflective surface S12 may be disposed between the first reflective surfaces S11. The second reflective surface S12 is an outer surface of the concave portion 430 and may be a surface constituting the first side surface S1. The second reflective surface S12 may be a surface connecting the outer surface of the adjacent extension portions 413. The second reflective surface S12 may be disposed on a region corresponding to a region between the plurality of light emitting devices 200 in an optical axis direction (second direction (y-axis direction)). For example, an apex of the second reflective surface S12 may overlap a center of a region between the light emitting devices 200 in an optical axis direction. The second reflective surface S12 may include a curved surface as the concave portion 430 has the above-described shape. The second reflective surface S12 may be provided as a curved surface having a set radius of curvature over the entire region. A radius of curvature of the second reflective surface S12 may be smaller than a radius of curvature of the first reflective surface S11. For example, the radius of curvature of the second reflective surface S12 may be about 0.5 mm to about 5 mm. In detail, the radius of curvature of the second reflective surface S12 may be about 0.5 mm to about 3 mm. When the radius of curvature of the second reflective surface S12 is less than about 0.5 mm, light incident on the concave portion 430 may be effectively reflected, but the first direction length X3 of the concave portion 430 may be excessively shortened. Accordingly, the luminance of the light L emitted to the second side surface S2 may not be uniform depending on the region. In addition, when the radius of curvature of the second reflective surface S12 exceeds about 5 mm, it may be difficult for the second reflective surface S12 to effectively reflect the light emitted from the light emitting device 200 in a set direction. Preferably, the radius of curvature of the second reflective surface S12, the length of the concave portion 430 in the second direction, and the length X3 of the concave portion 430 in the first direction may satisfy a ratio of 1:1:2 to prevent light reflection of the concave portion 430 and the luminance of light emitted to the second side surface S2.

That is, the concave portion 430 includes a second reflective surface S12 including a curved surface, and the horizontal width defined as the first direction length (x-axis direction) of the concave portion 430 may vary according to the optical axis distance from the light emitting device 200. For example, the horizontal width of the concave portion 430 may increase as the distance from the light emitting device 200 increases. In detail, the horizontal width of the concave portion 430 may increase as the distance from the light emitting device 200 in the optical axis direction (second direction (y-axis direction)) increases. That is, the horizontal width defined as the length of the second reflective surface S12 in the first direction may increase as the distance from the light emitting device 200 in the optical axis direction increases. For example, the horizontal width of the concave portion 430 may increase as the distance from the light emitting device 200 increases. In detail, the horizontal width of the concave portion 430 may increase as the distance from the light emitting device 200 in the optical axis direction (second direction (y-axis direction)) increases. That is, the horizontal width defined as the length of the second reflective surface S12 in the first direction may increase as the distance from the light emitting device 200 in the optical axis direction increases.

The lighting apparatus 1000 according to an embodiment may include a plurality of protruding portions 410 facing the light emitting surfaces 201 of the light emitting devices 200, and at least one concave portion 430 disposed between the plurality of protruding portions 410. In this case, the protruding portions 410 and the concave portion 430 may have a set first direction length and a set second direction length, and the light L emitted from the light emitting device 200 may be reflected on the protruding portion 410 and provided in the direction of the second side surface S2. For example, the light L emitted from the light emitting device 200 may be emitted in a direction of the first side surface S1, and the light L may be reflected on the first side surface S1 and provided in a direction of the second side surface S2. Specifically, the light L emitted from the light emitting device 200 may be reflected on the first reflective surface S11 of the protruding portion 410 including the curved surface and the second reflective surface S12 of the concave portion 430 and emitted outward through the second side surface S2. That is, the lighting apparatus 1000 may emit light in an indirect light method in which a light emission direction of the device and a light emission direction of the light emitting device 200 are opposite.

In this case, the lighting apparatus 1000 may have a length in the second direction set for uniformity of light emitted through the second side surface S2. For example, the second directional distance Y7 between the apex of the light emitting device 200 and the protruding portion 410 may be different from the second directional distance Y8 between the light emitting device 200 and the second side surface S2. Specifically, the second directional distance Y7 between the light emitting device 200 and the apex of the first reflective surface S11 may be longer than the second directional distance Y8 between the light emitting device 200 and the second side surface S2. Here, the second directional distance Y7 between the apex of the light emitting device 200 and the protruding portion 410 means the second directional distance between the apex of the protruding portion 410 from the center of the light emitting device 200 and it may be the same as the sum of the second direction distance Y2 of the protruding portion 410 and the second direction length Y5 from the light emitting device 200 to the extension portion 413.

In addition, the second directional distance Y8 between the light emitting device 200 and the second side surface S2 may mean a second directional distance from the center of the light emitting device 200 to the second side surface S2. The second directional distance Y8 between the light emitting device 200 and the second side surface S2 may be about 0.3 to 0.9 times the second directional distance Y7 between the light emitting device 200 and the apex of the first reflective surface S11. In detail, the distance Y8 in the second direction may be about 0.5 to 0.8 times the distance Y7 in the second direction.

For example, a distance Y8 between the light emitting device 200 and the second side surface S2 in the second direction may be about 7 mm to about 15 mm. In detail, the distance Y8 between the light emitting device 200 and the second side surface S2 in the second direction may be about 8 mm to about 12 mm. When the second directional distance Y8 between the light emitting device 200 and the second side surface S2 is less than about 7 mm, light reflected on the first side surface S1 and provided in the direction of the second side surface S2 may not secure a sufficient light guide distance. Accordingly, the luminance of the light L emitted to the second side surface S2 may not be uniform depending on the region. In addition, when the second directional distance Y8 between the light emitting device 200 and the second side surface S2 exceeds about 15 mm, the light L provided in the direction of the second side S2 may secure a light guide distance, but the overall luminance of the lighting apparatus 1000 may decrease due to an increase in the movement path of light. Therefore, it is preferable that the distance Y8 between the light emitting device 200 and the second side surface S2 satisfies the above-described range and ratio.

Figure 5:
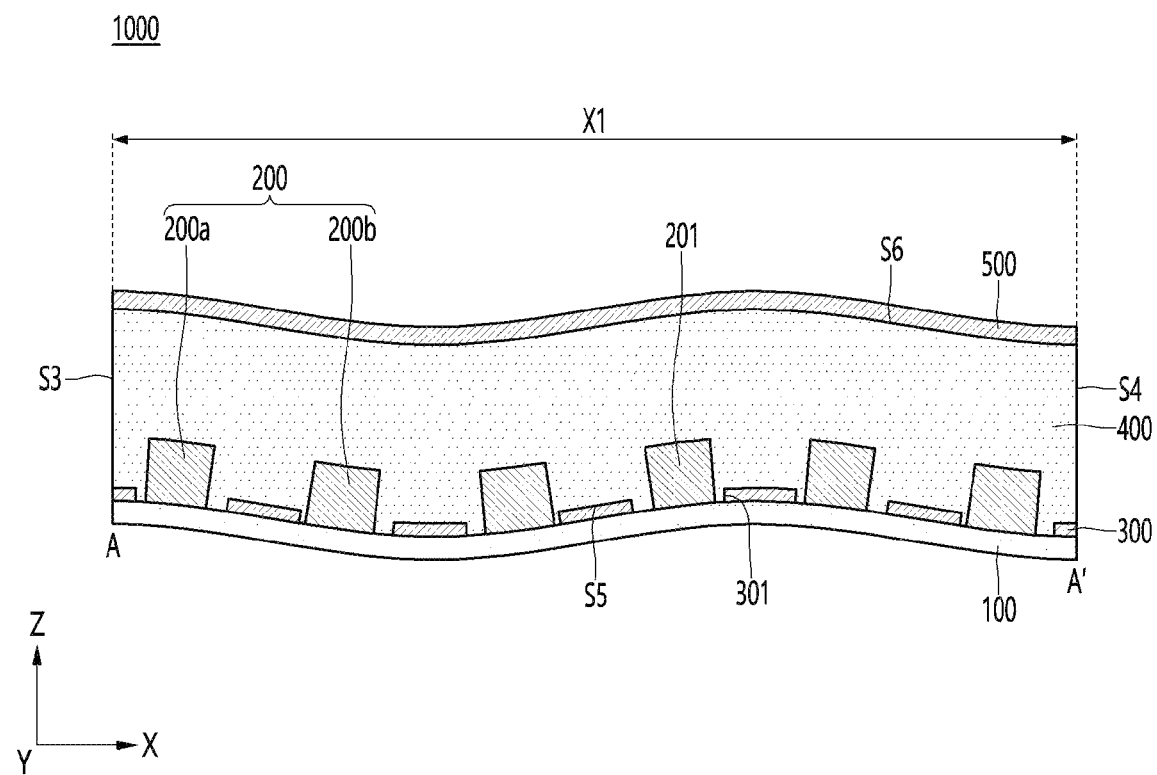
FIGS. 5 and 6 are views showing that the lighting apparatus according to the embodiment has a shape bent in various directions.
Figure 6:
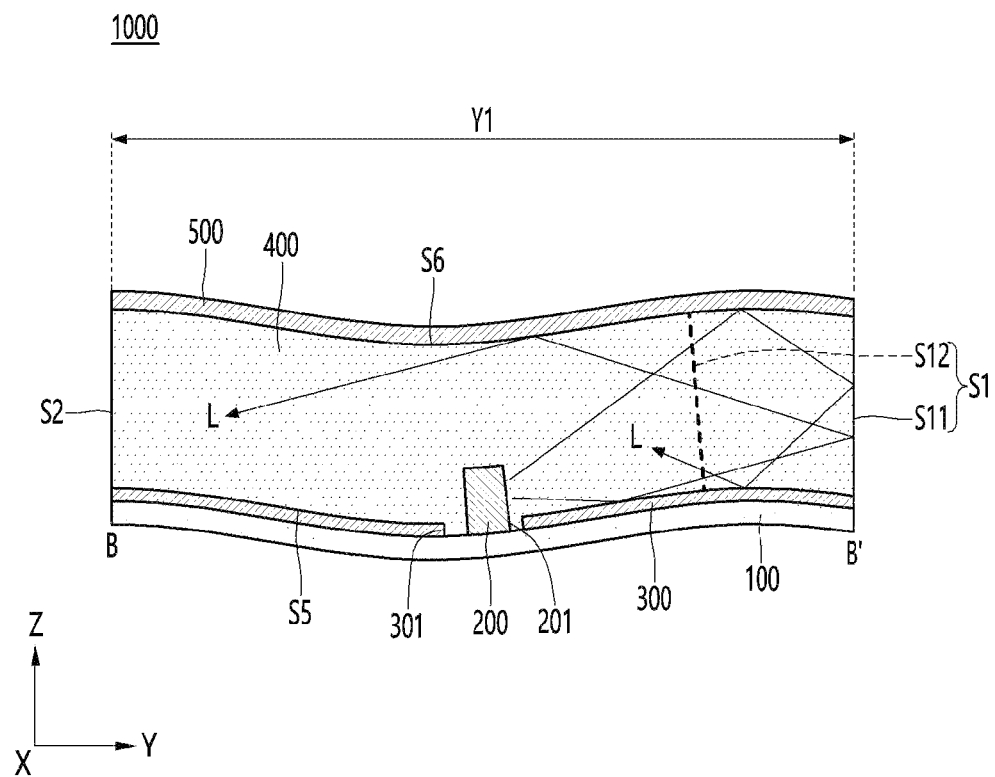

FIGS. 5 and 6 are views showing that the lighting apparatus according to the embodiment has a shape bent in various directions. The lighting apparatus 1000 according to the embodiment may be provided in a form bent in at least one direction among the first to third directions (x, y, and z-axis directions). For example, at least one of long and short axes of the resin layer 400 may include a curvature.

Referring to FIG. 5, the long axis (first direction) of the resin layer 400 may include a curvature. In detail, the lower surface S5 and the upper surface S6 of the resin layer 400 may include curved surfaces having a predetermined curvature. Accordingly, the lighting apparatus 1000 may be provided in a meandering shape in the first direction. Referring to FIG. 6, the short axis (second direction) of the resin layer 400 may include a curvature. In detail, the lower surface S5 and the upper surface S6 of the resin layer 400 may include curved surfaces having a predetermined curvature. Accordingly, the lighting apparatus 1000 may be provided in a meandering shape in the second direction. That is, the lighting apparatus 1000 according to the embodiment may be provided in a form in which at least one of the long and short axes includes a straight line or a curved line. Accordingly, the lighting apparatus 1000 may provide a line light source or a surface light source having uniform and high luminance by being provided in a straight line or a curved shape on a substrate having various shapes.

The lighting apparatus 1000 according to the embodiment may be applied to a lamp as an example of a vehicle lamp, a vehicle lamp, a side mirror lamp, a fog lamp, a tail lamp, a brake lamp, a daytime running lamp, a vehicle interior light, a door scarf, a rear combination lamp, or a backup lamp.

Figure 7:
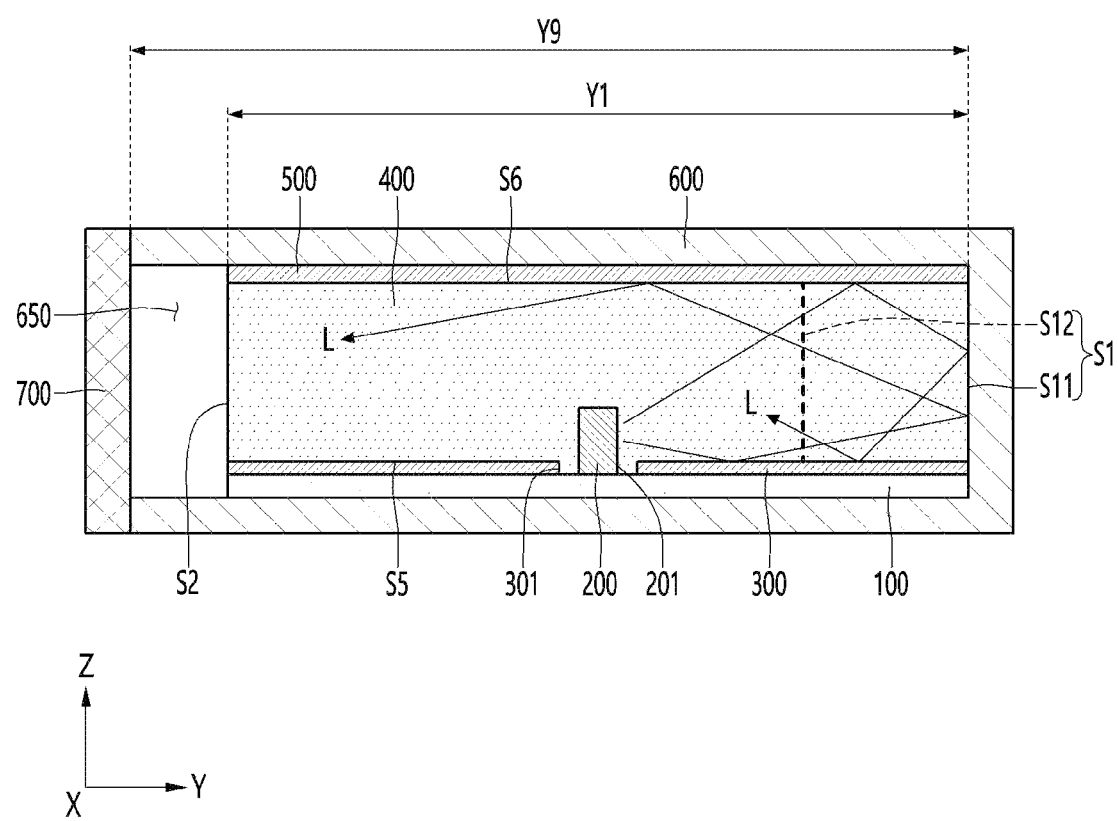
FIGS. 7 and 8 are views illustrating a lamp to which a lighting apparatus according to the embodiment is applied.
Figure 8:
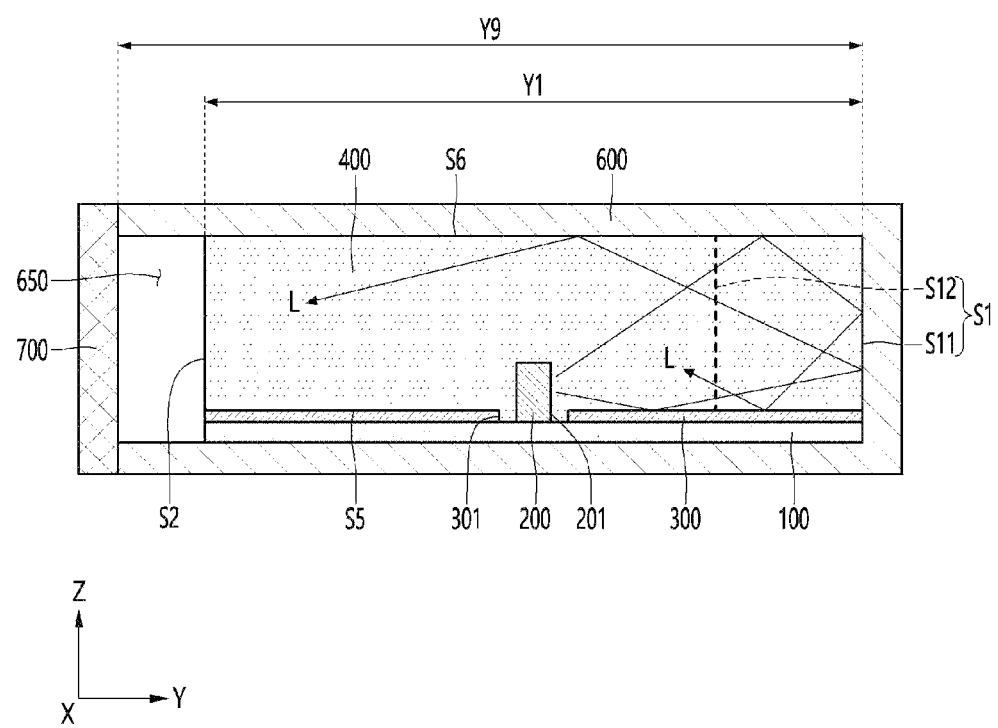
Figure 9:
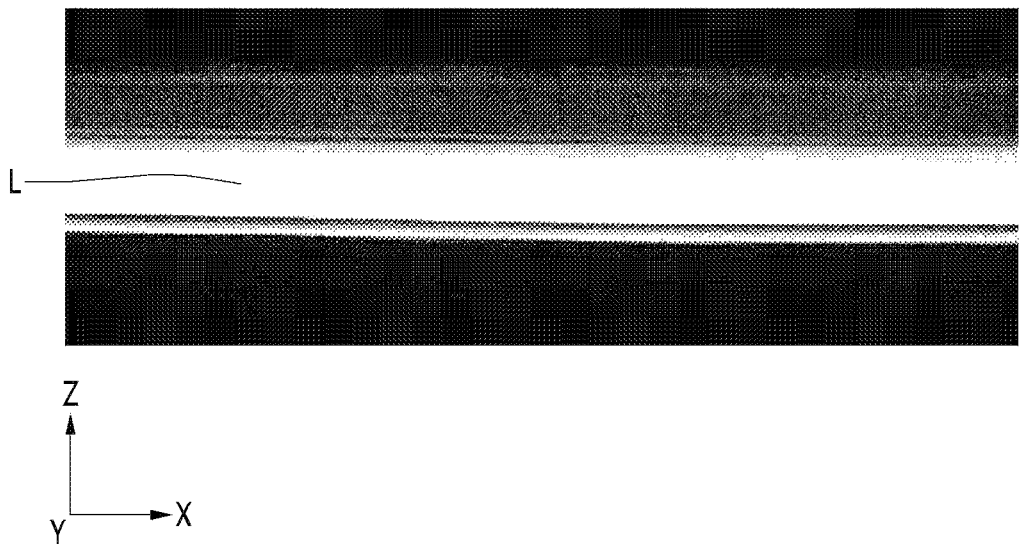
FIG. 9 is a diagram illustrating a shape of light emitted from a lamp according to the embodiment.

FIGS. 7 and 8 are views illustrating a lamp to which a lighting apparatus according to the embodiment is applied. FIG. 9 is a diagram illustrating a shape of light emitted from a lamp according to an embodiment.

Referring to FIGS. 7 to 9, the lamp may include the above-described lighting apparatus 1000 and a housing 600 accommodating the lighting apparatus 1000. One side of the housing 600 is open and may include a receiving space 650 therein. The lighting apparatus 1000 may be disposed in the receiving space 650. In this case, the lighting apparatus 1000 may be disposed to face one side of the housing 600 with the second side surface S2 open, and the first side surface S1 may be disposed to face the other side surface opposite to the one side. That is, one open side of the housing 600 may be a light emitting surface of the lamp. The receiving space 650 may have a shape corresponding to that of the lighting apparatus 1000. In detail, the height (z-axis direction) of the receiving space 650 may correspond to the height of the lighting apparatus 1000. An inner surface of the receiving space 650 may directly contact the upper and lower surfaces of the lighting apparatus 1000. The other side of the receiving space 650 may have a shape corresponding to that of the lighting apparatus 1000. In detail, the other side surface of the receiving space 650 may have a shape corresponding to that of the first side surface S1. That is, the other side surface of the receiving space 650 may have a shape corresponding to the convex portion 411 or may have a concavo-convex structure. The other side surface of the receiving space 650 may directly contact the first side surface S1 of the lighting apparatus 1000. In detail, the other side surface of the receiving space 650 may directly contact the first reflective surface S11.

The receiving space 650 may have lengths in the first direction and in the second direction. A length of the receiving space 650 in the first direction may be greater than or equal to a length X1 of the lighting apparatus 1000 in the first direction. For example, the length of the receiving space 650 in the first direction may be the same as the length X1 of the lighting apparatus 1000 in the first direction. A length Y9 of the receiving space 650 in the second direction may be greater than or equal to a length Y1 of the lighting apparatus 1000 in the second direction. In detail, the length Y9 of the receiving space 650 in the second direction may be 1 to about 1.2 times the length Y1 of the lighting apparatus 1000 in the second direction. In more detail, the length Y9 of the receiving space 650 in the second direction may be 1 to about 1.15 times the length Y1 of the lighting apparatus 1000 in the second direction. For example, the length Y9 of the receiving space 650 in the second direction may be shorter than the length Y1 of the lighting apparatus 1000 in the second direction by about 4 mm or less. In detail, the length Y9 of the receiving space 650 in the second direction may be shorter than the length Y1 of the lighting apparatus 1000 in the second direction by about 3 mm or less. In more detail, a difference between the length Y9 of the receiving space 650 in the second direction and the length Y1 of the lighting apparatus 1000 in the second direction may be 0 mm to about 2 mm. In this case, when the length difference Y9-Y1 is 0 mm, one end of the housing 600 may be disposed on the same plane as the side surface of the lighting apparatus 1000, for example, the second side surface S2, and the light emitting surface of the lamp may be disposed on the same plane as one end of the housing 600. Accordingly, as shown in FIG. 9, the lamp may provide a uniform light L, for example, a uniform line light source or a surface light source, to an open region of one side of the housing 600. In addition, as the housing 600 surrounds the lighting apparatus 1000 and is disposed, the lighting apparatus 1000 may not be exposed to the outside or may be minimized. Thus, the lamp may have improved reliability.

In addition, the lamp according to the embodiment may minimize a length difference between the lighting apparatus 1000 and the receiving space 650 in the second direction. Accordingly, loss of light emitted from the lighting apparatus 1000 due to reflection on the housing 600 may be minimized, and the lamp may be provided in a slimmer form. The housing 600 may include a material having predetermined reliability. For example, the housing 600 may include a non-metal material such as a metal material, resin, or ceramic. The housing 600 may include a material having excellent reflection characteristics or may be provided in a color having excellent light reflection characteristics. Alternatively, a color having excellent reflective properties or excellent light reflective properties may be coated or deposited on the inner surface of the receiving space 650. Accordingly, the housing 600 may prevent light loss by reflecting light emitted through at least one of the side surfaces of the resin layer 400 of the lighting apparatus 1000, for example, the first side surface S1, the third side surface S3, and the fourth side surface S4. It is possible to prevent light loss by reflecting light emitted through the side surface. In addition, the housing 600 may maximize the amount of light emitted through the light emitting surface of the lamp by reflecting the light emitted through the side surfaces of the resin layer 400 toward the second side surface S2.

When the inner surface of the housing 600 exposed by the receiving space 650 has a light reflectance higher than a set value, the second reflective layer 500 may be omitted as shown in FIG. 8. In this case, the upper surface S6 of the resin layer 400 may be disposed in direct contact with the inner surface of the housing 600. In addition, the light L emitted from the light emitting device 200 may be reflected on the inner surface of the housing 600 facing the upper surface S6 of the resin layer 400 and provided in the direction of the second side S2. Accordingly, the overall thickness of the lighting apparatus 1000 may be reduced, and a lamp including the lighting apparatus 1000 may be provided slimmer.

The lamp may further include a lens 700. The lens 700 may be disposed on one side of the open housing 600. The lens 700 may face the second side surface S2. The lens 700 may be a clear lens that transmits light emitted from the lighting apparatus 1000. The lens 700 may have a predetermined thickness and shield one open side of the housing 600. To this end, the lens 700 may have a height greater than or equal to the height of the receiving space 650. Also, the lens 700 may have a length equal to or longer than the length of the receiving space 650 in the first direction. Accordingly, the lens 700 may contact or be separated from the lighting apparatus 1000. For example, the lens 700 may be spaced apart from the second side surface S2 of the lighting apparatus 1000 within a range of about 4 mm or less, or may directly contact the second side surface S2. Accordingly, the lens 700 may effectively protect the lighting apparatus 1000 disposed in the housing 600, and the light L emitted from the lighting apparatus 1000 may be provided in the form of a uniform light source or a surface light source through the lens 700.

Figure 10:
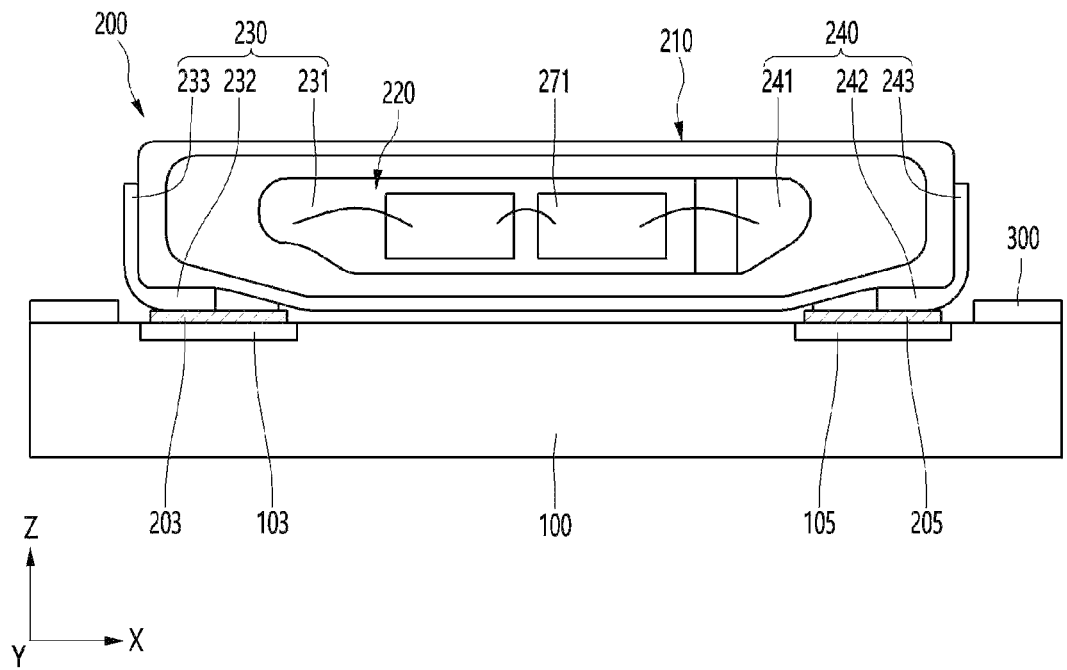
FIG. 10 is a front view of a light emitting device applied to a lighting apparatus according to the embodiment.
Figure 11:
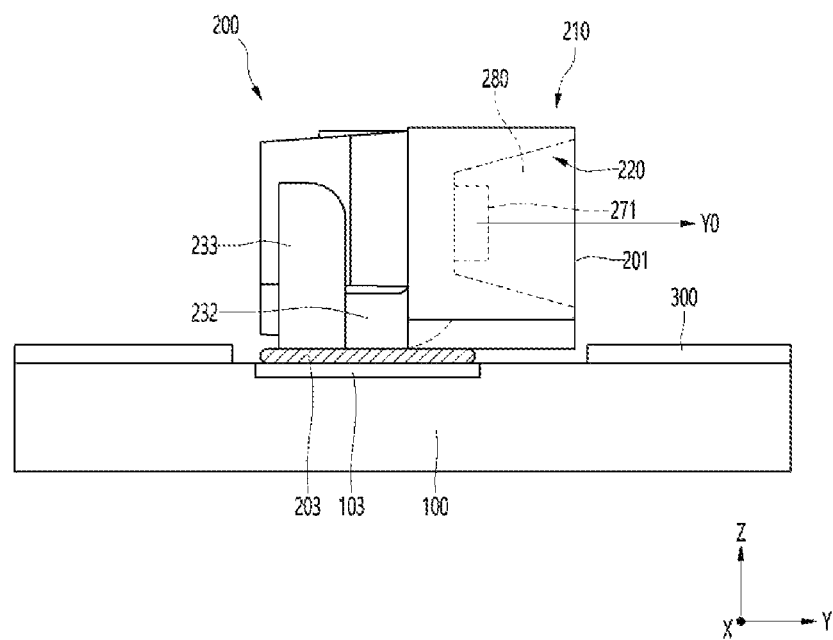
FIG. 11 is a side view of a light emitting device applied to a lighting apparatus according to the embodiment.

FIG. 10 is a front view of a light emitting device applied to a lighting apparatus according to an embodiment, and FIG. 11 is a side view of a light emitting device applied to a lighting apparatus according to the embodiment.

Referring to FIGS. 10 and 11, the light emitting device 200 includes a body 210 having a cavity 220, a plurality of lead frames 230 and 240 in the cavity 220, and a light emitting chip 271 disposed on at least one of the plurality of lead frames 230 and 240. The light emitting device 200 may be implemented as a side light emitting package. The body 210 may include the cavity 220 at the bottom of which the lead frames 230 and 240 are exposed. The plurality of lead frames 230 and 240 are separated into, for example, a first lead frame 230 and a second lead frame 240 and coupled to the body 210.

The body 210 may be formed of an insulating material. The body 210 may be formed of a reflective material. The body 210 may be formed of a material having a reflectance higher than transmittance, for example, a reflectance of 70% or more with respect to a wavelength emitted from the light emitting chip. The body 210 may be defined as a non-transmissive material or a reflective material when the reflectance is 70% or more. The body 210 may be formed of a resin material such as a resin-based insulating material, for example, polyphthalamide (PPA). The body 210 may be formed of a silicone-based, epoxy-based, or thermosetting resin including a plastic material, or a material having high heat resistance and high light resistance. The body 210 includes a white-based resin. The body 210 may be molded by at least one selected from the group consisting of epoxy resin, modified epoxy resin, silicone resin, modified silicone resin, acrylic resin, and urethane resin. For example, an epoxy resin made of triglycidyl isocyanurate, hydrogenated bisphenol A diglycidyl ether etc., and an acid anhydride made of hexahydro anhydrous phthalic acid, 3-methylhexahydro anhydrous phthalic acid 4-methylhexahydro anhydrous phthalic acid etc., may be used as an epoxy resin by adding DBU (1,8-Diazabicyclo (5,4,0) undecene-7) as a curing accelerator and ethylene glycol, titanium oxide pigment, glass fiber as a co-catalyst, and partially cured by heating. The body 210 may appropriately mix at least one selected from the group consisting of a diffusion agent, a pigment, a fluorescent material, a reflective material, a light shielding material, a light stabilizer, and a lubricant with the thermosetting resin.

The body 210 may include a reflective material, for example, a resin material to which a metal oxide is added, and the metal oxide may include at least one of $TiO_2$, $SiO_2$, and $Al_2O_3$. This body 210 may effectively reflect incident light. As another example, the body 210 may be formed of a light-transmissive resin material or a resin material having a phosphor that converts the wavelength of incident light. The bottom of the body 210 may be a side surface corresponding to the substrate 200.

The first lead frame 230 includes a first lead portion 231 disposed on the bottom of the cavity 220, a first bonding portion 232 extending outside the body 210, and a first heat dissipation portion 233. The first bonding part 232 may be bent from the first lead part 231 and protrude to the outside of the body in the body 210, and the first heat dissipation part 233 may be bent from the first bonding part 232.

The second lead frame 240 includes a second lead part 241 disposed on the bottom of the cavity 220, a second bonding part 242 disposed on an outer region of the body 210, and a second heat dissipation part 243. The second bonding part 242 may be bent from the second lead part 241 within the body 210, and the second heat dissipating part 243 may be bent from the second bonding part 242.

Here, the light emitting chip 271 may be disposed on the first lead part 231 of the first lead frame 230, and may be connected to the first and second lead parts 231 and 241 by wire, or may be connected to the first lead part 231 by adhesive and to the second lead part 241. The light emitting chip 271 may be a horizontal chip, a vertical chip, or a chip having a via structure. The light emitting chip 271 may be mounted in a flip chip method. The light emitting chip 271 may selectively emit light within a wavelength range of ultraviolet to visible light. The light emitting chip 271 may be selected from, for example, an ultraviolet LED chip, a red LED chip, a blue LED chip, a green LED chip, and a yellow green LED chip. The light emitting chip 271 may include at least one of a group II-VI compound and a group III-V compound. The light emitting chip 271 may be formed of, for example, a compound selected from the group consisting of GaN, AlGaN, InGaN, AlInGaN, GaP, AlN, GaAs, AlGaAs, InP, and mixtures thereof.

One or a plurality of the light emitting chips 271 may be disposed in the cavity 220 and emit light with the greatest intensity in the direction of the central axis Y0. In addition, one or a plurality of light emitting chips 271 may be disposed in the cavity.

A sealing member 280 is disposed in the cavity 220 of the body 210, and the sealing member 280 includes a light-transmitting resin such as silicon or epoxy and may be formed in a single layer or multiple layers. A phosphor for changing the wavelength of light emitted from the light emitting chip 271 may be included on the sealing member 280 or the light emitting chip 271, and the phosphor excites a part of the light emitted from the light emitting chip 271 to emit light of a different wavelength. The phosphor may be selectively formed from quantum dots, YAG, TAG, silicate, nitride, and oxy-nitride-based materials. The phosphor may include at least one of a red phosphor, a yellow phosphor, and a green phosphor, but is not limited thereto.

The emission surface of the sealing member 280 is the light emitting surface 201 of the light emitting device 200 and may be formed in a flat shape, a concave shape, a convex shape, etc., but is not limited thereto. As another example, a light-transmitting film having a phosphor may be disposed on the cavity 220, but is not limited thereto. A lens may be further formed on the upper part of the body 210, and the lens may include a concave or/and convex lens structure, and light distribution of light emitted by the light emitting device 200 may be adjusted. A semiconductor device such as a light receiving device or a protection device may be mounted on the body 210 or any one lead frame, and the protection device may be implemented as a thyristor, a Zener diode, or a TVS (Transient voltage suppression), and the Zener diode protects the light emitting chip from ESD (electrostatic discharge).

At least one or a plurality of light emitting devices 200 may be disposed on the substrate 200, and a first reflective layer 300 may be disposed around a lower portion of the light emitting device 200. The first and second lead parts 233 and 243 of the light emitting device 200 may be bonded to the pads 103 and 105 of the substrate 200 with solder or conductive tape as conductive bonding members 203 and 205.

Figure 12:
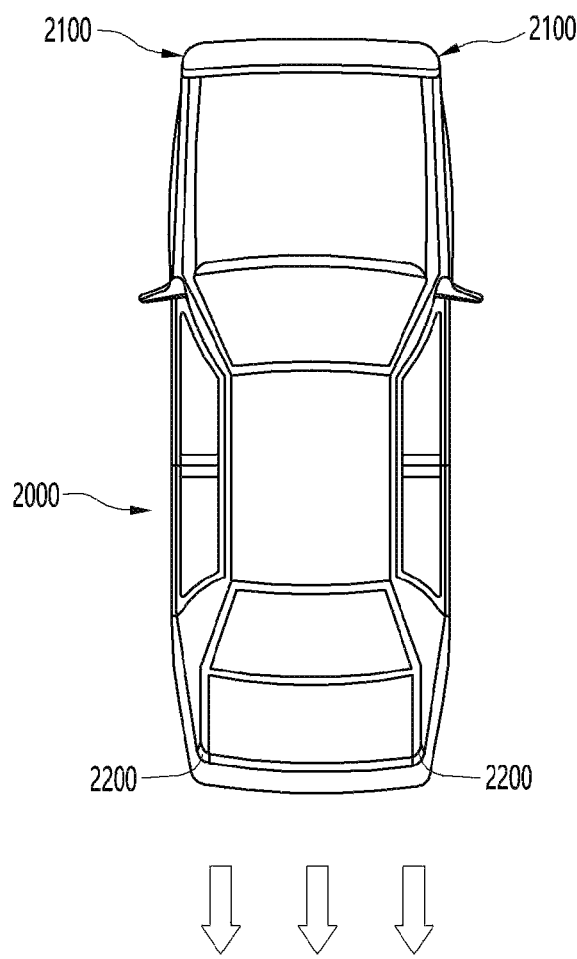
FIGS. 12 to 14 are views illustrating examples in which a lamp including a lighting apparatus according to the embodiment is applied to a vehicle.
Figure 13:
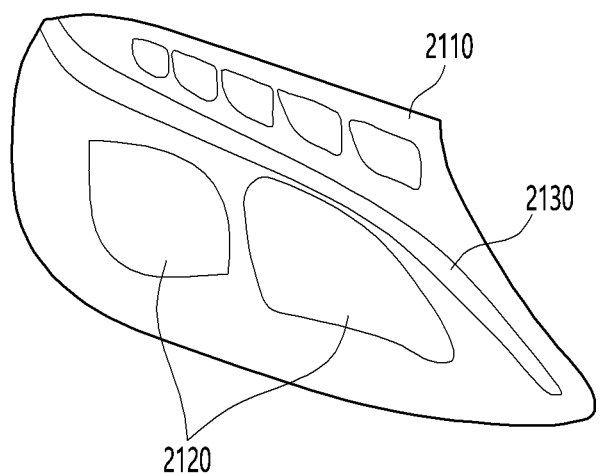
Figure 14:
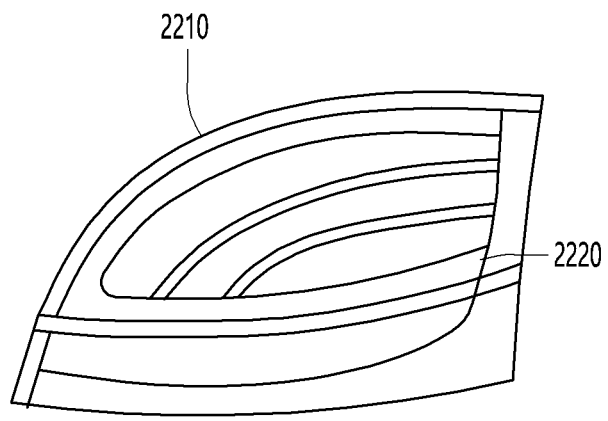

FIGS. 12 to 14 are views illustrating examples in which a lamp including a lighting apparatus according to an embodiment is applied to a vehicle. In detail, FIG. 12 is a top view of a vehicle to which the lamp having the lighting apparatus is applied, FIG. 13 is an example in which the lighting apparatus according to an embodiment is disposed in front of the vehicle, and FIG. 14 is an example in which the lighting apparatus according to the embodiment is disposed in the rear of the vehicle.

Referring to FIGS. 12 to 14, a lighting apparatus 1000 according to an embodiment may be applied to a vehicle 2000. One or more lamps may be disposed in at least one of the front, rear, and lateral sides of the vehicle 2000. For example, referring to FIG. 13, a lamp including the lighting apparatus 1000 may be applied to a front lamp 2100 of a vehicle. The front lamp 2100 may include a first cover member 2110 and at least one first lamp module 2120 including the lamp. The first cover member 2110 accommodates the first lamp module 2120 and may be made of a light-transmitting material. The first cover member 2110 may have a curve according to the design of the vehicle 2000 and may be provided in a flat or curved shape according to the shape of the first lamp module 2120.

The front lamp 2100 may provide a plurality of functions by controlling the driving timing of the lighting apparatus 1000 included in the first lamp module 2120. For example, the front lamp 2100 may provide at least one function of a headlamp, a turn signal lamp, a daytime running lamp, a high lamp, a low lamp, and a fog lamp by light emitted from the lighting apparatus 1000. In addition, the front lamp 2100 may provide additional functions such as a welcome light or a celebration effect when the driver opens the vehicle door.

Referring to FIG. 14, a lamp including the lighting apparatus 1000 may be applied to a rear lamp 2200 of a vehicle. The rear lamp 2200 may include a second cover member 2210 and at least one second lamp module 2220 including the lamp. The second cover member 2210 accommodates the second lamp module 2220 and may be made of a light-transmitting material. The second cover member 2210 may have a curve according to the design of the vehicle 2000 and may be provided in a flat or curved shape according to the shape of the second lamp module 2220. The back lamp 2200 may provide a plurality of functions by controlling the driving timing of the lighting apparatus 1000 included in the second lamp module 2220. For example, the rear lamp 2200 may provide at least one function of a sidelight, a brake light, and a direction indicator light by light emitted from the lighting apparatus 1000.

Features, structures, effects, etc. described in the embodiments above are included in at least one embodiment of the present invention, and are not necessarily limited to only one embodiment. Furthermore, the features, structures, effects, etc. illustrated in each embodiment can be combined or modified with respect to other embodiments by those skilled in the art in the field to which the embodiments belong. Therefore, contents related to these combinations and variations should be construed as being included in the scope of the present invention. In addition, although described based on the embodiments above, this is only an example, not limiting this invention, it will be apparent to those skilled in the art that various modifications and applications not illustrated above can be made without departing from the essential characteristics of this embodiment. For example, each component specifically shown in the embodiment can be modified and implemented. And the differences related to these modifications and applications should be construed as being included in the scope of the present invention as defined in the appended claims.

The invention claimed is:

1. A lighting apparatus comprising:
   a substrate;
   a plurality of light emitting devices arranged in a first direction on the substrate;
   a first reflective layer disposed on the substrate;
   a resin layer disposed on the first reflective layer; and
   a second reflective layer disposed on the resin layer,
   wherein the resin layer includes a first side surface facing light emitting surfaces of the plurality of light emitting devices and a second side surface opposite to the first side surface,
   wherein the first side surface includes a plurality of first reflective surfaces having a convex shape with respect to the light emitting surface of each of the plurality of light emitting devices; and at least one second reflective surface having a concave shape with respect to the light emitting surface of each of the plurality of the light emitting devices,
   wherein the plurality of first reflective surfaces is disposed on regions corresponding to each of the plurality of light emitting devices in an optical axis direction,
   wherein one of the at least one second reflective surface is disposed between at least two of the plurality of first reflective surfaces,
   wherein light emitted through the light emitting surfaces of the plurality of light emitting devices is reflected from the first side surface and emitted through the second side surface,
   wherein the resin layer includes a plurality of protruding portions protruding from the first side surface facing the emission surfaces of the light emitting devices and at least one concave portion having a concave shape on the first side surface,
   wherein each of the plurality of protruding portions is disposed in a region corresponding to the plurality of light emitting devices in the optical axis direction, respectively,
   wherein one of the at least one concave portion is disposed between at least two of the plurality of protruding portions,
   wherein each of the plurality of protruding portions includes a convex portion having a convex shape with respect to the light emitting surface of each of the light emitting devices, and an extension portion disposed between the convex portion and each of the light emitting devices,
   wherein each of the plurality of first reflective surfaces and the at least one second reflective surface include one or more curved surfaces,
   wherein a radius of curvature of one of the at least one second reflective surface is smaller than a radius of curvature of each of the first reflective surfaces,
   wherein an apex of each of the first reflective surfaces and an optical axis of each of the light emitting devices overlap in a second direction, and
   wherein a length of one of the extension portions in the second direction is shorter than a length of one of the convex portions in the second direction.

2. The lighting apparatus of claim 1, wherein one of the at least one second reflective surface is disposed on a respective region corresponding to a region between at least two of the plurality of light emitting devices in the optical axis direction, and
   wherein a length of one of the at least one concave portion in the first direction is shorter than the length of the one of the convex portions in the second direction and the length of the one of the extension portions in the second direction.

3. The lighting apparatus of claim 2, wherein the length of the one of the extension portion portions in the second direction is in a range of 1 mm to 4 mm.

4. The lighting apparatus of claim 3, wherein the radius of curvature of each of the first reflective surfaces is in a range of 4 mm to 15 mm.

5. The lighting apparatus of claim 3, wherein one of the first reflective surfaces and one of the at least one second reflective surfaces have respective horizontal widths in a direction perpendicular to the optical axis direction,
   wherein the horizontal width of the one of the first reflective surfaces is greater than the horizontal width of the one of the at least one second reflective surface, and
   wherein the horizontal width of the one of the plurality of first reflective surfaces is greater than a horizontal width of each of the light emitting devices.

6. The lighting apparatus of claim 3, wherein the resin layer includes a third side surface and a fourth side surface disposed between the first side surface and the second side surface,
   wherein the third side surface and the fourth side surface face each other,
   wherein one of the plurality of protruding portions has a shape protruding in the second direction from an imaginary first straight line connecting one end of the third side surface and one end of the fourth side surface, and
   wherein one of the at least one concave portion has a concave shape extending in the second direction from the imaginary first straight line.

7. The lighting apparatus of claim 1, wherein a distance from each of the light emitting devices to each of the first reflective surfaces in the optical axis direction is longer than a distance from each of the light emitting devices to the second side surface in the optical axis direction.

8. A lamp comprising:
   a housing having one side open and a receiving space therein; and
   the lighting apparatus of claim 1, the lighting apparatus being disposed within the receiving space of the housing,
   wherein the second side surface of the lighting apparatus is disposed to face the one side open of the housing, and provides a linear light source or a surface light source.

9. The lamp of claim 8, comprising:
   a lens disposed on the one side open of the housing,
   wherein the lens has a height equal to or higher than a height of the receiving space.

10. The lamp of claim 8, wherein a side of the receiving space adjacent to the first side surface of the lighting apparatus has a shape corresponding to the first side surface of the lighting apparatus.

11. The lamp of claim 8, wherein a side of the receiving space adjacent to the first side surface of the lighting apparatus is in contact with the first side surface of the lighting apparatus.

12. The lamp of claim 8, wherein a length of the receiving space in the second direction is in a range of 1 to 1.2 times a length of the lighting apparatus in the second direction.

13. The lighting apparatus of claim 1, comprising:
   a plurality of reflective patterns protruding from an upper surface of the first reflective layer, wherein the plurality of reflective patterns is disposed between the light emitting devices and the second side surface.

14. The lighting apparatus of claim 1,
wherein a thickness of the resin layer is less than twice a thickness of each light emitting device,
wherein the second side surface of the resin layer provides a linear light source or a surface light source.

15. The lighting apparatus of claim 1,
wherein a length of one of the at least one concave portion in the first direction is shorter than a length of the protruding portion in the first direction, and
wherein a length from each of the light emitting devices to a nearest one of the at least one concave portion in the second direction is in a range of 3.5 mm to 5.5 mm.

16. A lighting apparatus comprising:
a substrate;
a plurality of light emitting devices disposed on the substrate;
a first reflective layer disposed on the substrate;
a resin layer disposed on the first reflective layer; and
a second reflective layer disposed on the resin layer,
wherein the resin layer includes a plurality of protruding portions protruding from a first side surface facing emission surfaces of the light emitting devices and a concave portion disposed between the plurality of the protruding portions,
wherein each of the plurality of protruding portions is disposed on a region corresponding to the plurality of light emitting devices in an optical axis direction,
wherein each of the protruding portions includes a convex portion having a convex shape with respect to the light emitting surface of each of the light emitting devices and an extension portion disposed between the convex portion and each of the light emitting devices,
wherein light emitted through the light emitting surfaces is reflected from the protruding portions and emitted through a second side surface facing the first side surface,
wherein the second side surface is a light emission surface and extends along a first direction,
wherein the first side surface and the second side surface face each other in a second direction orthogonal to the first direction,
wherein the resin layer includes a third side surface and a fourth side surface disposed between the first side surface and the second side surface,
wherein the third side surface is a side surface connecting one end of the first side surface and one end of the second side surface,
wherein the fourth side surface is a side surface connecting the other end of the first side surface and the other end of the second side surface,
wherein each of the plurality of protruding portions has a shape protruding in the second direction from an imaginary first straight line connecting one end of the third side surface and one end of the fourth side surface,
wherein each of the plurality of protruding portions has a convex curved surface,
wherein the concave portion has a concave curved surface, and
wherein the concave portion has a concave shape extending in the second direction from the imaginary first straight line.

17. The lighting apparatus of claim 16, wherein the convex portions and the extension portions have respective horizontal widths in a direction perpendicular to the optical axis direction,
wherein the horizontal width of the extension portions is constant,
wherein the horizontal width of the convex portions decreases as a distance between each of the convex portions and a corresponding one of the light emitting devices increases.

18. The lighting apparatus of claim 17, wherein a length of one of the extension portions in the optical axis direction is shorter than a length of one of the convex portions in the optical axis direction.

19. The lighting apparatus of claim 16, comprising:
a plurality of reflective patterns protruding from an upper surface of the first reflective layer,
wherein the plurality of reflective patterns is disposed between the light emitting devices and the second side surface.

20. The lighting apparatus of claim 16,
wherein a thickness of the resin layer is less than twice a thickness of each of the light emitting devices,
wherein the second side surface of the resin layer provides a linear light source or a planar light source,
wherein a length of the concave portion in the first direction is shorter than a length of one of the protruding portions in the first direction, and
wherein a length from each of the light emitting devices to the concave portion in the second direction is in a range of 3.5 mm to 5.5 mm.

* * * * *